US011700691B2

(12) United States Patent
Rooyakkers et al.

(10) Patent No.: US 11,700,691 B2
(45) Date of Patent: *Jul. 11, 2023

(54) INDUSTRIAL CONTROL SYSTEM CABLE

(71) Applicant: Bedrock Automation Platforms Inc., San Jose, CA (US)

(72) Inventors: Albert Rooyakkers, Sunnyvale, CA (US); James G. Calvin, Attleboro, MA (US); Craig Markovic, Vancouver (CA); Ken Doucette, Norton, MA (US); Brian Anderson, Ashland, MA (US)

(73) Assignee: Bedrock Automation Platforms Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,069

(22) Filed: Nov. 10, 2020

(65) Prior Publication Data
US 2021/0195742 A1   Jun. 24, 2021

Related U.S. Application Data

(63) Continuation of application No. 14/446,412, filed on Jul. 30, 2014, now Pat. No. 10,834,820, which is a
(Continued)

(51) Int. Cl.
*H01R 13/60* (2006.01)
*H05K 1/11* (2006.01)
(Continued)

(52) U.S. Cl.
CPC ......... *H05K 1/117* (2013.01); *H01R 13/5841* (2013.01); *H04L 63/062* (2013.01); *H04L 63/0869* (2013.01); *H04L 63/20* (2013.01)

(58) Field of Classification Search
CPC .. H01R 13/5841; H05K 1/117; H04L 63/062; H04L 63/0869; H04L 63/20
(Continued)

(56) References Cited

U.S. PATENT DOCUMENTS 1,778,549 A * 10/1930 Conner ............. H01R 13/6335
200/51 R
1,961,013 A * 5/1934 Saraceno ............... H01R 13/56
439/459
(Continued)

FOREIGN PATENT DOCUMENTS

CN   2162746 Y   4/1994
CN   1408129 A   4/2003
(Continued)

OTHER PUBLICATIONS

Office Action for Japanese Application No. 2015-136186, dated Oct. 10, 2019.
(Continued)

Primary Examiner — Abdullah A Riyami
Assistant Examiner — Vladimir Imas
(74) Attorney, Agent, or Firm — Kevin E. West; Advent, LLP

(57) ABSTRACT

A cable includes a wiring assembly with a knuckle and wires bundled together. The cable also includes a connector assembly with a connector having connections for the wires, where the connections are arranged along a longitudinal axis. In some embodiments, the connector assembly captures an end of the wiring assembly, and the knuckle of the wiring assembly is pivotally connected to the connector assembly. In some embodiments, the cable includes circuitry configured to authenticate the cable to a device connected to the cable by the connector and/or to authenticate the device connected to the cable. A control system includes control elements and/or subsystems coupled with a backplane adjacent to one another and cables configured to connect to the control elements and/or subsystems. Wiring assemblies of the cables can articulate to be parallel to each respective
(Continued)

connector. Further, each cable can authenticate the cables and/or the control elements or subsystems.

20 Claims, 10 Drawing Sheets

Related U.S. Application Data continuation-in-part of application No. PCT/US2013/053721, filed on Aug. 6, 2013.

(60) Provisional application No. 62/021,438, filed on Jul. 7, 2014.

(51) Int. Cl.
  *H01R 13/58* (2006.01)
  *H04L 9/40* (2022.01)

(58) Field of Classification Search
  USPC .................................................. 439/540.1
  See application file for complete search history.

(56) References Cited

U.S. PATENT DOCUMENTS

| | | | |
|---|---|---|---|
| 2,540,575 A * | 2/1951 | Finizie | H01R 13/562 |
| | | | 439/446 |
| 3,702,983 A * | 11/1972 | Chace | H01R 9/2408 |
| | | | 439/682 |
| 4,079,440 A * | 3/1978 | Ohnuma | H05K 1/117 |
| | | | 361/803 |
| 4,082,984 A | 4/1978 | Iwata | |
| 4,337,499 A * | 6/1982 | Cronin et al. | H05K 7/1449 |
| | | | 439/31 |
| 4,403,286 A | 9/1983 | Fry et al. | |
| 4,508,414 A * | 4/1985 | Kusui | H01R 13/6592 |
| | | | 439/607.47 |
| 4,628,308 A | 12/1986 | Robert | |
| 4,656,622 A | 4/1987 | Lea | |
| 4,672,529 A | 6/1987 | Kupersmit | |
| 4,691,384 A | 9/1987 | Jobe | |
| 4,789,792 A | 12/1988 | Ruedi | |
| 4,882,702 A | 11/1989 | Struger et al. | |
| 4,929,939 A | 5/1990 | Varma et al. | |
| 4,932,892 A * | 6/1990 | Hatch | H01R 12/675 |
| | | | 439/417 |
| 5,013,247 A * | 5/1991 | Watson | H01R 12/79 |
| | | | 439/55 |
| 5,128,664 A | 7/1992 | Bishop | |
| 5,229,652 A | 7/1993 | Hough | |
| 5,325,046 A | 6/1994 | Young et al. | |
| 5,378,166 A * | 1/1995 | Gallagher, Sr. | H01R 13/518 |
| | | | 439/501 |
| 5,385,487 A * | 1/1995 | Beitman | H05K 7/1448 |
| | | | 439/549 |
| 5,385,490 A * | 1/1995 | Demeter | H01R 13/514 |
| | | | 439/540.1 |
| 5,388,099 A * | 2/1995 | Poole | H05K 1/14 |
| | | | 370/386 |
| 5,422,558 A | 6/1995 | Stewart | |
| 5,469,334 A | 11/1995 | Balakrishnan | |
| 5,519,583 A * | 5/1996 | Kolling | H05K 7/1458 |
| | | | 439/62 |
| 5,546,463 A | 8/1996 | Caputo et al. | |
| 5,572,511 A | 11/1996 | Ouyang et al. | |
| 5,590,284 A | 12/1996 | Crosetto | |
| 5,602,754 A | 2/1997 | Beatty et al. | |
| 5,603,044 A * | 2/1997 | Annapareddy | G06F 13/409 |
| | | | 361/733 |
| 5,719,483 A | 2/1998 | Abbott et al. | |
| 5,724,349 A | 3/1998 | Cloonan et al. | |
| 5,735,707 A * | 4/1998 | O'Groske | H01R 13/56 |
| | | | 439/446 |
| 5,757,795 A | 5/1998 | Schnell | |
| 5,773,962 A | 6/1998 | Nor | |
| 5,860,824 A * | 1/1999 | Fan | B60R 11/0241 |
| | | | 439/669 |
| 5,896,473 A * | 4/1999 | Kaspari | G02B 6/43 |
| | | | 385/139 |
| 5,909,368 A | 6/1999 | Nixon et al. | |
| 5,951,666 A | 9/1999 | Ilting et al. | |
| 5,958,030 A | 9/1999 | Kwa | |
| 5,963,448 A | 10/1999 | Flood et al. | |
| 5,980,312 A * | 11/1999 | Chapman | G02B 6/4452 |
| | | | 361/788 |
| 6,002,675 A | 12/1999 | Ben-Michael et al. | |
| 6,009,410 A | 12/1999 | Lemole et al. | |
| 6,016,310 A | 1/2000 | Muller et al. | |
| 6,046,513 A | 4/2000 | Jouper et al. | |
| 6,104,913 A | 8/2000 | McAllister | |
| 6,124,778 A | 9/2000 | Rowley et al. | |
| 6,178,474 B1 * | 1/2001 | Hamano | G06F 1/1632 |
| | | | 710/2 |
| 6,218,740 B1 | 4/2001 | Mildice | |
| 6,219,789 B1 | 4/2001 | Little et al. | |
| 6,220,889 B1 * | 4/2001 | Ely | H01R 13/5841 |
| | | | 439/446 |
| 6,347,963 B1 * | 2/2002 | Falkenberg | H01R 12/7088 |
| | | | 361/788 |
| 6,393,565 B1 | 5/2002 | Lockhart et al. | |
| 6,435,409 B1 * | 8/2002 | Hu | H01R 35/02 |
| | | | 235/441 |
| 6,453,416 B1 | 9/2002 | Epstein | |
| 6,480,963 B1 | 11/2002 | Tachibana et al. | |
| 6,490,176 B2 | 12/2002 | Holzer et al. | |
| 6,574,681 B1 | 6/2003 | White et al. | |
| 6,597,683 B1 | 7/2003 | Gehring et al. | |
| 6,643,777 B1 | 11/2003 | Chu | |
| 6,680,904 B1 | 1/2004 | Kaplan et al. | |
| 6,695,620 B1 * | 2/2004 | Huang | H01R 13/562 |
| | | | 439/11 |
| 6,714,541 B1 | 3/2004 | Iyer et al. | |
| 6,799,234 B1 | 9/2004 | Moon et al. | |
| 6,812,803 B2 | 11/2004 | Goergen | |
| 6,814,580 B2 * | 11/2004 | Li | H01R 39/643 |
| | | | 439/446 |
| 6,828,894 B1 | 12/2004 | Sorger et al. | |
| 6,840,795 B1 * | 1/2005 | Takeda | H01R 12/772 |
| | | | 439/456 |
| 6,956,355 B2 | 10/2005 | Vaillancourt et al. | |
| 6,988,162 B2 | 1/2006 | Goergen | |
| 7,164,255 B2 | 1/2007 | Hui | |
| 7,172,428 B2 * | 2/2007 | Huang | H01R 35/00 |
| | | | 439/31 |
| 7,200,692 B2 | 4/2007 | Singla et al. | |
| 7,234,963 B1 * | 6/2007 | Huang | H01R 35/00 |
| | | | 439/446 |
| 7,254,452 B2 | 8/2007 | Davlin et al. | |
| 7,402,074 B2 * | 7/2008 | LeBlanc | B60Q 1/0483 |
| | | | 439/534 |
| 7,415,368 B2 | 8/2008 | Gilbert et al. | |
| 7,426,585 B1 * | 9/2008 | Rourke | G06F 13/385 |
| | | | 710/313 |
| 7,460,482 B2 | 12/2008 | Pike | |
| 7,510,420 B2 * | 3/2009 | Mori | G06F 13/409 |
| | | | 439/8 |
| 7,526,676 B2 | 4/2009 | Chou et al. | |
| 7,529,862 B2 | 5/2009 | Isani et al. | |
| 7,536,548 B1 | 5/2009 | Batke et al. | |
| 7,554,288 B2 | 6/2009 | Gangstoe et al. | |
| 7,587,481 B1 | 9/2009 | Osburn, III | |
| 7,614,909 B2 * | 11/2009 | Lin | F16M 11/041 |
| | | | 439/528 |
| 7,619,386 B2 | 11/2009 | Sasaki et al. | |
| 7,622,994 B2 | 11/2009 | Galal | |
| 7,660,998 B2 | 2/2010 | Walmsley | |
| 7,670,190 B2 * | 3/2010 | Shi | H01R 24/58 |
| | | | 439/640 |
| 7,685,349 B2 * | 3/2010 | Allen | H04Q 1/08 |
| | | | 710/301 |
| 7,730,304 B2 | 6/2010 | Katsube et al. | |

(56) References Cited

U.S. PATENT DOCUMENTS

| | | | |
|---|---|---|---|
| 7,746,846 B2 | 6/2010 | Boora et al. | |
| 7,761,640 B2 | 7/2010 | Hikabe | |
| 7,774,074 B2 | 8/2010 | Davlin et al. | |
| 7,788,431 B2 | 8/2010 | Deshpande et al. | |
| 7,790,304 B2 | 9/2010 | Hendricks et al. | |
| 7,811,136 B1* | 10/2010 | Hsieh | H01R 24/60 439/31 |
| 7,815,471 B2* | 10/2010 | Wu | H01R 35/04 439/31 |
| 7,822,994 B2 | 10/2010 | Hamaguchi | |
| 7,839,025 B2 | 11/2010 | Besser et al. | |
| 7,872,561 B2 | 1/2011 | Matumoto | |
| 7,948,758 B2* | 5/2011 | Buhler | H05K 1/0206 361/689 |
| 7,960,870 B2 | 6/2011 | Besser et al. | |
| 7,971,052 B2 | 6/2011 | Lucas et al. | |
| 8,013,474 B2 | 9/2011 | Besser et al. | |
| 8,019,194 B2* | 9/2011 | Morrison | H04N 5/77 386/293 |
| 8,032,745 B2 | 10/2011 | Bandholz et al. | |
| 8,062,070 B2* | 11/2011 | Jeon | H01R 13/6473 439/620.22 |
| 8,125,208 B2 | 2/2012 | Gyland | |
| 8,132,231 B2 | 3/2012 | Amies et al. | |
| 8,143,858 B2 | 3/2012 | Tsugawa et al. | |
| 8,149,587 B2* | 4/2012 | Baran | H05K 7/1485 361/788 |
| 8,157,569 B1* | 4/2012 | Liu | H01R 35/04 439/11 |
| 8,181,262 B2 | 5/2012 | Cooper et al. | |
| 8,189,101 B2* | 5/2012 | Cummings | H04N 21/4325 439/135 |
| 8,212,399 B2 | 7/2012 | Besser et al. | |
| 8,266,360 B2 | 9/2012 | Agrawal | |
| 8,281,386 B2 | 10/2012 | Milligan et al. | |
| 8,287,306 B2* | 10/2012 | Daugherty | H01R 13/518 439/540.1 |
| 8,295,770 B2* | 10/2012 | Seil | B60R 11/02 455/41.3 |
| 8,310,380 B2 | 11/2012 | Aria et al. | |
| 8,380,905 B2 | 2/2013 | Djabbari et al. | |
| 8,390,441 B2 | 3/2013 | Covaro et al. | |
| 8,465,762 B2 | 6/2013 | Lee et al. | |
| 8,480,438 B2* | 7/2013 | Mattson | H01R 13/641 439/676 |
| 8,532,119 B2 | 9/2013 | Snively et al. | |
| 8,560,147 B2 | 10/2013 | Taylor et al. | |
| 8,587,318 B2 | 11/2013 | Chandler et al. | |
| 8,651,874 B2 | 2/2014 | Ku et al. | |
| 8,677,145 B2 | 3/2014 | Maletsky et al. | |
| 8,694,770 B1 | 4/2014 | Osburn, III | |
| 8,777,671 B2* | 7/2014 | Huang | H01R 35/04 439/11 |
| 8,862,802 B2 | 10/2014 | Calvin et al. | |
| 8,868,813 B2 | 10/2014 | Calvin et al. | |
| 8,971,072 B2 | 3/2015 | Calvin et al. | |
| 9,071,082 B2 | 6/2015 | Nishibayashi et al. | |
| 9,318,917 B2 | 4/2016 | Kubota et al. | |
| 9,436,641 B2 | 9/2016 | Calvin et al. | |
| 9,465,762 B2 | 10/2016 | Calvin et al. | |
| 9,467,297 B2 | 10/2016 | Clish et al. | |
| 9,812,803 B2 | 11/2017 | Toyoda et al. | |
| 10,103,875 B1 | 10/2018 | Roth et al. | |
| 10,613,567 B2 | 4/2020 | Rooyakkers et al. | |
| 11,093,427 B2 | 8/2021 | Calvin et al. | |
| 2002/0070835 A1 | 6/2002 | Dadafshar | |
| 2002/0080828 A1 | 6/2002 | Ofek et al. | |
| 2002/0080829 A1 | 6/2002 | Ofek et al. | |
| 2002/0084698 A1 | 7/2002 | Kelly et al. | |
| 2002/0086678 A1 | 7/2002 | Salokannel et al. | |
| 2002/0095573 A1 | 7/2002 | O'Brien | |
| 2002/0097031 A1 | 7/2002 | Cook et al. | |
| 2002/0116619 A1 | 8/2002 | Maruyama et al. | |
| 2002/0124198 A1 | 9/2002 | Bormann et al. | |
| 2002/0171525 A1 | 11/2002 | Kobayashi et al. | |
| 2002/0182898 A1 | 12/2002 | Takahashi et al. | |
| 2002/0189910 A1 | 12/2002 | Yano et al. | |
| 2003/0005289 A1 | 1/2003 | Gougeon et al. | |
| 2003/0013727 A1 | 1/2003 | Maw et al. | |
| 2003/0040897 A1 | 2/2003 | Murphy et al. | |
| 2003/0074489 A1 | 4/2003 | Steger et al. | |
| 2003/0094855 A1 | 5/2003 | Lohr et al. | |
| 2003/0105601 A1 | 6/2003 | Kobayashi et al. | |
| 2003/0137277 A1 | 7/2003 | Mori et al. | |
| 2003/0166397 A1 | 9/2003 | Aura | |
| 2003/0202330 A1 | 10/2003 | Lopata et al. | |
| 2003/0204756 A1 | 10/2003 | Ransom et al. | |
| 2003/0236998 A1 | 12/2003 | Gilstrap et al. | |
| 2004/0178770 A1 | 9/2004 | Gagnon et al. | |
| 2005/0001589 A1 | 1/2005 | Edington et al. | |
| 2005/0019143 A1 | 1/2005 | Bishman | |
| 2005/0091432 A1 | 4/2005 | Adams et al. | |
| 2005/0102535 A1 | 5/2005 | Patrick et al. | |
| 2005/0144437 A1 | 6/2005 | Ransom et al. | |
| 2005/0144440 A1 | 6/2005 | Catherman et al. | |
| 2005/0151720 A1 | 7/2005 | Cruz-Hernandez et al. | |
| 2005/0162019 A1 | 7/2005 | Masciarelli et al. | |
| 2005/0182876 A1 | 8/2005 | Kim et al. | |
| 2005/0189910 A1 | 9/2005 | Hui | |
| 2005/0198522 A1 | 9/2005 | Shaw et al. | |
| 2005/0229004 A1 | 10/2005 | Callaghan | |
| 2006/0015590 A1 | 1/2006 | Patil et al. | |
| 2006/0020782 A1 | 1/2006 | Kakii | |
| 2006/0108972 A1 | 5/2006 | Araya | |
| 2006/0119315 A1 | 6/2006 | Sasaki et al. | |
| 2006/0155990 A1 | 7/2006 | Katsube et al. | |
| 2006/0156415 A1* | 7/2006 | Rubinstein | G06F 21/602 726/27 |
| 2007/0072442 A1 | 3/2007 | DiFonzo et al. | |
| 2007/0076768 A1 | 4/2007 | Chiesa et al. | |
| 2007/0123304 A1 | 5/2007 | Pattenden et al. | |
| 2007/0123316 A1 | 5/2007 | Little | |
| 2007/0143838 A1 | 6/2007 | Milligan et al. | |
| 2007/0174524 A1 | 7/2007 | Kato et al. | |
| 2007/0177298 A1 | 8/2007 | Jaatinen et al. | |
| 2007/0192134 A1 | 8/2007 | Littenberg et al. | |
| 2007/0194944 A1 | 8/2007 | Galera et al. | |
| 2007/0214296 A1 | 9/2007 | Takamatsu et al. | |
| 2007/0229302 A1 | 10/2007 | Penick et al. | |
| 2007/0260897 A1 | 11/2007 | Cochran et al. | |
| 2008/0067874 A1 | 3/2008 | Tseng | |
| 2008/0077976 A1 | 3/2008 | Schulz | |
| 2008/0080395 A1 | 4/2008 | Law et al. | |
| 2008/0082449 A1 | 4/2008 | Wilkinson et al. | |
| 2008/0123669 A1 | 5/2008 | Oliveti et al. | |
| 2008/0140888 A1 | 6/2008 | Blair et al. | |
| 2008/0181316 A1 | 7/2008 | Crawley et al. | |
| 2008/0189441 A1 | 8/2008 | Jundt et al. | |
| 2008/0194124 A1 | 8/2008 | Di | |
| 2008/0209216 A1 | 8/2008 | Kelly et al. | |
| 2008/0285755 A1 | 11/2008 | Camus et al. | |
| 2008/0303351 A1 | 12/2008 | Jansen et al. | |
| 2009/0036164 A1 | 2/2009 | Rowley | |
| 2009/0061678 A1* | 3/2009 | Minoo | G06F 21/44 439/502 |
| 2009/0066291 A1 | 3/2009 | Tien et al. | |
| 2009/0083843 A1 | 3/2009 | Wilkinson, Jr. et al. | |
| 2009/0091513 A1 | 4/2009 | Kuhn | |
| 2009/0092248 A1 | 4/2009 | Rawson | |
| 2009/0121704 A1 | 5/2009 | Shibahara | |
| 2009/0204458 A1 | 8/2009 | Wiese et al. | |
| 2009/0217043 A1 | 8/2009 | Metke et al. | |
| 2009/0222885 A1 | 9/2009 | Batke et al. | |
| 2009/0234998 A1 | 9/2009 | Kuo | |
| 2009/0239468 A1 | 9/2009 | He et al. | |
| 2009/0245245 A1 | 10/2009 | Malwankar et al. | |
| 2009/0254655 A1 | 10/2009 | Kidwell et al. | |
| 2009/0256717 A1 | 10/2009 | Iwai | |
| 2009/0278509 A1 | 11/2009 | Boyles et al. | |
| 2009/0287321 A1 | 11/2009 | Lucas et al. | |
| 2009/0288732 A1 | 11/2009 | Gielen | |
| 2010/0052428 A1 | 3/2010 | Imamura et al. | |
| 2010/0066340 A1 | 3/2010 | Delforge | |

(56) References Cited

U.S. PATENT DOCUMENTS

| | | |
|---|---|---|
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0038114 A1 | 2/2011 | Pance et al. |
| 2011/0057291 A1 | 3/2011 | Slupsky et al. |
| 2011/0066309 A1 | 3/2011 | Matsuoka et al. |
| 2011/0074349 A1 | 3/2011 | Ghovanloo |
| 2011/0080056 A1 | 4/2011 | Low et al. |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0150431 A1 | 6/2011 | Klappert |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1* | 11/2012 | Ku .................. H01R 35/02 439/586 |
| 2012/0284354 A1 | 11/2012 | Mukundan et al. |
| 2012/0284514 A1 | 11/2012 | Lambert |
| 2012/0295451 A1 | 11/2012 | Hyun-Jun et al. |
| 2012/0297101 A1 | 11/2012 | Neupaertl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audéon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0019790 A1 | 1/2015 | Calvin et al. |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0303729 A1 | 10/2015 | Kasai et al. |
| 2015/0365240 A1 | 12/2015 | Callaghan |
| 2016/0036098 A1 | 2/2016 | Washiro |
| 2016/0065656 A1 | 3/2016 | Patin et al. |
| 2016/0069174 A1 | 3/2016 | Cannan et al. |
| 2016/0141894 A1 | 5/2016 | Beaston |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2018/0190427 A1 | 7/2018 | Rooyakkers et al. |

FOREIGN PATENT DOCUMENTS

| | | |
|---|---|---|
| CN | 1440254 A | 9/2003 |
| CN | 2596617 Y | 12/2003 |
| CN | 1571335 A | 1/2005 |
| CN | 1702582 A | 11/2005 |
| CN | 1839581 A | 9/2006 |
| CN | 1864305 A | 11/2006 |
| CN | 2899151 Y | 5/2007 |
| CN | 101005359 A | 7/2007 |
| CN | 101069407 A | 11/2007 |
| CN | 101262401 A | 9/2008 |
| CN | 101322089 A | 12/2008 |
| CN | 101349916 A | 1/2009 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 201590580 U | 9/2010 |
| CN | 101919139 A | 12/2010 |
| CN | 101977104 A | 2/2011 |
| CN | 102035220 A | 4/2011 |
| CN | 102123031 A | 7/2011 |
| CN | 102236329 A | 11/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103064032 A | 4/2013 |
| CN | 203180248 U | 9/2013 |
| CN | 103376766 A | 10/2013 |
| CN | 103682883 A | 3/2014 |
| CN | 103701919 A | 4/2014 |
| CN | 203645015 U | 6/2014 |
| CN | 104025387 A | 9/2014 |
| CN | 203932181 U | 11/2014 |
| CN | 104185969 A | 12/2014 |
| CN | 104297691 A | 1/2015 |
| CN | 104505894 A | 4/2015 |
| CN | 204243110 U | 4/2015 |
| CN | 105278327 A | 1/2016 |
| CN | 105556762 A | 5/2016 |
| CN | 104025387 B | 7/2018 |
| DE | 102013213550 A1 | 1/2015 |
| EP | 0473336 A2 | 3/1992 |
| EP | 0507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 2179364 A2 | 4/2010 |
| EP | 2317743 A1 | 5/2011 |
| EP | 2450921 A1 | 5/2012 |
| EP | 1396065 B1 | 7/2012 |
| EP | 2557657 A2 | 2/2013 |
| EP | 2557670 A2 | 2/2013 |

(56) References Cited

FOREIGN PATENT DOCUMENTS

| | | |
|---|---|---|
| EP | 1885085 B1 | 3/2013 |
| EP | 2613421 A1 | 7/2013 |
| EP | 2777796 A1 | 9/2014 |
| EP | 2806319 A2 | 11/2014 |
| EP | 2966806 A1 | 1/2016 |
| JP | S5974413 U | 5/1984 |
| JP | S59177226 U | 11/1984 |
| JP | H0163190 U | 4/1989 |
| JP | H0794354 A | 6/1990 |
| JP | H02164012 A | 6/1990 |
| JP | H04153705 A | 5/1992 |
| JP | H04245411 A | 9/1992 |
| JP | H05346809 A | 12/1993 |
| JP | 07075143 | 3/1995 |
| JP | H07105328 A | 4/1995 |
| JP | H07320963 A | 12/1995 |
| JP | H0837121 A | 2/1996 |
| JP | H0898274 A | 4/1996 |
| JP | H08241824 A | 9/1996 |
| JP | H08322252 A | 12/1996 |
| JP | H09182324 A | 7/1997 |
| JP | H09213548 A | 8/1997 |
| JP | H1189103 A | 3/1999 |
| JP | H1198215 A | 4/1999 |
| JP | H1198707 A | 4/1999 |
| JP | H11230504 A | 8/1999 |
| JP | H11235044 A | 8/1999 |
| JP | H11312013 A | 11/1999 |
| JP | 2000041068 A | 2/2000 |
| JP | 2000124890 A | 4/2000 |
| JP | 2000252143 A | 9/2000 |
| JP | 2001100809 A | 4/2001 |
| JP | 2001242971 A | 9/2001 |
| JP | 2001292176 A | 10/2001 |
| JP | 2001307055 A | 11/2001 |
| JP | 2002134071 A | 5/2002 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003142327 A | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2004532596 A | 10/2004 |
| JP | 2005020759 A | 1/2005 |
| JP | 2005038411 A | 2/2005 |
| JP | 2005513956 A | 5/2005 |
| JP | 2005151720 A | 6/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006164706 A | 6/2006 |
| JP | 2006180460 A | 7/2006 |
| JP | 2006223950 A | 8/2006 |
| JP | 2006238274 A | 9/2006 |
| JP | 2006254650 A | 9/2006 |
| JP | 2007034711 A | 2/2007 |
| JP | 2007096817 A | 4/2007 |
| JP | 2007519150 A | 7/2007 |
| JP | 2007238696 A | 9/2007 |
| JP | 2007252081 A | 9/2007 |
| JP | 2007535235 A | 11/2007 |
| JP | 2008008861 A | 1/2008 |
| JP | 2008172873 A | 7/2008 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2009054086 A | 3/2009 |
| JP | 2009065759 A | 3/2009 |
| JP | 2009157913 A | 7/2009 |
| JP | 2009163909 A | 7/2009 |
| JP | 2009538112 A | 10/2009 |
| JP | 2010011351 A | 1/2010 |
| JP | 2010503134 A | 1/2010 |
| JP | 4439340 B2 | 3/2010 |
| JP | 2010515407 A | 5/2010 |
| JP | 2010135903 A | 6/2010 |
| JP | 2010205163 A | 9/2010 |
| JP | 2010233167 A | 10/2010 |
| JP | 2010533387 A | 10/2010 |
| JP | 2011078249 A | 4/2011 |
| JP | 2011217037 A | 10/2011 |
| JP | 2011223544 A | 11/2011 |
| JP | 2012033491 A | 2/2012 |
| JP | 5013019 B1 | 8/2012 |
| JP | 2012190583 A | 10/2012 |
| JP | 2012195259 A | 10/2012 |
| JP | 2013021798 A | 1/2013 |
| JP | 2013031358 A | 2/2013 |
| JP | 2013153596 A | 8/2013 |
| JP | 2013170258 A | 9/2013 |
| JP | 2013192389 A | 9/2013 |
| JP | 5362930 B1 | 12/2013 |
| JP | 2014507721 A | 3/2014 |
| JP | 2014080952 A | 5/2014 |
| JP | 2015023375 A | 2/2015 |
| JP | 2016021763 A | 2/2016 |
| JP | 2016512039 A | 4/2016 |
| JP | 2016149128 A | 8/2016 |
| JP | 2016527844 A | 9/2016 |
| JP | 6189479 B1 | 8/2017 |
| JP | 2019146257 A | 8/2019 |
| JP | 2020115457 A | 7/2020 |
| KR | 20020088540 A | 11/2002 |
| KR | 20050014790 A | 2/2005 |
| KR | 20060034244 A | 4/2006 |
| KR | 100705380 B1 | 4/2007 |
| KR | 100807377 B1 | 2/2008 |
| KR | 20130039174 A | 4/2013 |
| TW | 201310344 A | 3/2013 |
| WO | 0180442 A2 | 10/2001 |
| WO | 02097946 A2 | 12/2002 |
| WO | 2005070733 A1 | 8/2005 |
| WO | 2005081659 A2 | 9/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2009142053 A1 | 11/2009 |
| WO | 2010117082 A1 | 10/2010 |
| WO | 2011104935 A1 | 9/2011 |
| WO | 2013031124 A1 | 3/2013 |
| WO | 2013033247 A1 | 3/2013 |
| WO | 2013102069 A1 | 7/2013 |
| WO | 2014061307 A1 | 4/2014 |
| WO | 2014177896 A1 | 9/2014 |
| WO | 2014179556 A1 | 11/2014 |
| WO | 2014179566 A1 | 11/2014 |
| WO | 2015020633 A1 | 2/2015 |

OTHER PUBLICATIONS

Partial European Search Report in European Application No. 17208183.8, dated Mar. 28, 2018.
Partial Supplementary European Search Report in Application No. 12862174.5, dated Nov. 3, 2015.
Partial European Search Report for European Patent Application No. EP 15175744 dated Jan. 4, 2016, 7 pages.
Partial Search Report for European Application No. 15175744.0, dated Dec. 14, 2015.
Partial Supplementary European Search Report dated Nov. 10, 2015 in Application# EP12862174.5.

(56) References Cited

OTHER PUBLICATIONS

Reason for Rejection in Japanese Patent Application No. 2016-533279, dated Aug. 13, 2018.
Reason for Rejection for Japanese Application No. 2015-136186, dated May 7, 2020.
Rodrigues A., "SCADA Security Device: Design and Implementation", Master of Science Thesis, Wichita State University, Dec. 2011.
Rodrigues, A., et al., "SCADA security device", Proceedings of the Seventh Annual Workshop on Cyber Security and Information Intelligence Research, CSIIRW '11, Jan. 1, 2011, p. 1, XP055230335, New York, New York, USA.
Roman Kleinerman, Daniel Feldman (May 2011), Power over Ethernet (PoE): An Energy-Efficient Alternative (PDF), Marvell, retrieved Sep. 25, 2018 @ http://www.marvell.com/switching/assets/Marveii-PoE-An-Energy-Efficient-Aiternative.pdf (Year: 2011).
Search Report for European Application No. 14196406.4, dated Nov. 4, 2015.
Search Report for European Application No. 16154943.1 dated Jun. 17, 2016.
Search Report for European Application No. 14196409.8, dated May 19, 2016.
Search Report for European Application No. 15175744.0, dated Apr. 26, 2016.
Siemens AG: "ERTEC 400 | Enhanced Real-Time Ethernet Controller | Handbuch",No. Version 1.2.2 pp. 1-98, XP002637652, Retrieved from the Internet: URL:http:llcache.automation.siemens.comldniiDUIDUxNDgzNwAA_21631481_HBIERTEC400_Handbuch_V122.pdf [retrieved on May 2, 2011].
Siemens, "Uninterruptible 24 V DC Power Supply High-Performance, communicative and integrated in TIA," Mar. 31, 2015,XP055290324.
Summons to attend oral proceedings for European Application No. 14196409.8, dated Nov. 13, 2019.
Supplementary European Search Report for European Patent Application No. EP 14791210 dated Dec. 16, 2016, 11 pages.
Supplementary Search Report for European Application No. 13890953.6 dated Jan. 26, 2017.
Supplementary Search Report for European Application No. 13891327.2, dated Jan. 10, 2017.
Supplementary Search Report for European Application No. 14791210.9, dated Dec. 6, 2016.
Supplementary European Search Report for European Patent Application No. EP 13890953 dated Feb. 6, 2017, 9 pages.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
Office Action for Chinese Application No. 201711349441.2, dated May 27, 2021.
Office Action for Japanese Application No. 2014-243830, dated Jun. 29, 2021.
Office Action for Japanese Application No. 2016-021763, dated Jun. 11, 2021.
Final Decision of Rejection and Decision of Dismissal of Amendment for Japanese Application No. 2016-080207, dated Sep. 10, 2021.
Office Action for Chinese Application No. 2020101058999, dated Sep. 3, 2021.
Office Action for Japanese Application No. 2020-135564, dated Jul. 20, 2021.
Chen, et al., "Active Diagnosability of Discrete Event Systems and its Application to Battery Fault Diagnosis," IEEE Transactions on Control Systems Technology, vol. 22, No. 5, Sep. 2014.
Examination Report for European Application No. 14196406.4, dated Mar. 31, 2021.
Extended European Search Report for European Application No. 20201408.0, dated Apr. 7, 2021.
Extended European Search Reported for European Application No. 20201403.1, dated Apr. 29, 2021.
Fang et al., "Application of expert diagnosis system in rechargeable battery," Department of Computer Science, , Qinghua University, Beijing, China, vol. 26, No. 3, Jun. 2002.
Generex System Gmbh, "BACS—Battery Analysis & Care System," Aug. 17, 2014 , XP055290320, Retrieved from the Internet: URL :HTTP://web.archive.org/we/2040929060116/http://www.generex.de/generex/download/datasheets/datasheet_BACS_C20_de.pdf.
Notice of Reasons for Rejection for Japanese Patent Application No. 2020-035778, dated Apr. 15, 2021.
Office Action for Chinese Application No. 201610229230.4, dated Mar. 18, 2021.
Reason for Rejection for Japanese Application No. 2020-061935, dated Mar. 31, 2021.
Notice of Reason for Rejection for Japanese Patent Application No. 2014-243830, dated Jul. 10, 2019.
Notice of Reason for Rejection for Japanese Patent Application No. 2014-243830, dated Sep. 21, 2018 .
Notice of Reason for Rejection for JP Patent Application No. 2018-109151, dated Jun. 25, 2019.
Notice of Reason for Rejection for Patent Application No. 2016-021763, dated Nov. 27, 2019.
Notice of Reasons for Rejection dated Jul. 13, 2017 for Japanese Application No. JP2016-533279.
Notice of Reasons for Rejection dated Mar. 1, 2018 for Japanese Application No. JP2016-533279.
Notification of the Second Office Action for Chinese Application No. 201380079514.4, dated Nov. 5, 2018.
Office Action for Canadian Application No. 2,875,515, dated Feb. 17, 2016.
Office Action for Canadian Application No. 2,920,133, dated Jan. 30, 2017.
Office Action for Canadian Application No. 2,920,133, dated Oct. 19, 2016.
Office Action for Chinese Application No. 2015103905202.2, dated Jun. 20, 2018.
Office Action for Chinese Application No. 2015103905202.2, dated Mar. 6, 2019.
Office Action for Chinese Application No. 2015103905202.2, dated Aug. 6, 2019.
Office Action dated Dec. 2, 2016 for JP Application No. 2014-550508.
Office Action dated Feb. 5, 2018 for Chinese Application No. CN201380079514.4.
Office Action for Canadian Application No. 2,875,515, dated Jun. 1, 2016.
Office Action for Canadian Application No. 2,875,515, dated Oct. 6, 2016.
Office Action for Canadian Application No. 2,875,518, dated Apr. 22, 2016.
Office Action for Canadian Application No. 2,875,518, dated Jun. 3, 2015.
Office Action for Chinese Application No. 201280065564.2 dated Oct. 19, 2017.
Office Action for Chinese Application No. 201410383686.7, dated Feb. 23, 2018.
Office Action for Chinese Application No. 201480034066.0, dated May 3, 2017.
Office Action for Chinese Appln No. 201380079515.9, dated Feb. 25, 2019.
Office Action for Chinese Patent Application 201410802889.5, dated May 7, 2019.
Office Action for Japanese Application No. 2014-080952, dated Jan. 7, 2019.
Office Action for Japanese Application No. 2014-080952, dated May 2, 2018.
Office Action for Japanese Application No. 2014-159475, dated Feb. 15, 2019.
Office Action for Japanese Application No. 2014-159475, dated Jun. 11, 2018.
Office Action for Japanese Application No. 2016-512039, dated Feb. 5, 2019.

(56) References Cited

OTHER PUBLICATIONS

Office Action for Japanese Application No. 2016-512039, dated Jun. 5, 2018.
Office Action for Japanese Application No. 2016-533280, dated Apr. 11, 2018.
Office Action for Japanese Application No. 2016-533280, dated Jan. 7, 2019.
Office Action for Japanese Application No. 2016-533280, dated Jun. 29, 2020.
Office Action for Canadian Application No. 2,920,133, dated Apr. 14, 2016.
Office Action for Canadian Application No. 2,875,515 dated Feb. 10, 2017.
Office Action for Canadian Application No. 2,875,515 dated Jul. 5, 2017.
Office Action for Candian Application No. 2,875,517 dated May 4, 2015.
Office Action for Chinese Application No. 201280065564.2, dated Aug. 3, 2016.
Office Action for Chinese Application No. 20141079995.2, dated Jul. 3, 2019.
Office Action for Chinese Application No. 201410802889.5 dated Jul. 26, 2018.
Office Action for Chinese Patent Application No. 201610236358.3, dated Jun. 24, 2020.
Office Action for Chinese Patent Application No. 201610236358.3, dated Sep. 4, 2019.
Office Action for EP Application No. 14196409.8 dated Jan. 22, 2018.
Office Action for Japanese Application No. 2016-533280, dated Jun. 28, 2017.
Office Action forChinese Patent Application 201410802889.5, dated Dec. 4, 2019.
Office Action from Chinese Patent Application No. 201610229230.4, dated Jul. 15, 2020.
Office Action from Chinese Patent Application No. 201610229230.4, dated Oct. 24, 2019.
Office Action from EP Application No. 14196406.4, dated Jul. 29, 2019.
Office Action for Chinese Application No. 201280065564.2, dated Feb. 28, 2017.
Chinese Office Action for Application No. 202010105899.9, dated Dec. 3, 2020.
European Examination Report for Application No. 14196406.4, dated May 12, 2020.
European Search Report for Application No. 20173319.3, dated Nov. 24, 2020.
Extended European Search Report for European Application No. 20150993.2, dated Apr. 29, 2020.
Final Decision for Rejection for Patent Application No. 2016-021763, dated Jul. 31, 2020.
Hosseinabady, Mohammad, et al., "Using the inter- and intra-switch regularity in NoC switch testing," Design, Automation & Test in Europe Conference & Exhibition: Nice, France, Apr. 16-20, 2007, IEEE Service Center, Apr. 16, 2007 (XP058290046).
Notice of Reason for Rejection for Japanese Application No. 2016-080207, dated Feb. 4, 2021.
Notice of Reason for Rejection for Japanese Application No. 2014-243827, dated Feb. 1, 2021.
Office Action for Chinese Patent Application No. 201610236358.3, dated Jan. 25, 2021.
Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
Canadian Office Action for Application No. 2920133 dated Jan. 30, 2017.
Canadian Office Action for Application No. 2920133 dated Oct. 19, 2016.
CGI, White Paper on "Public Key Encryption and Digital Signature: How do they work?", 2004 (refer to pp. 3-4).
Chinese Office Action for Application No. 201380079515.9 dated Aug. 7, 2018.
Chinese Office Action for Application No. 201380079515.9 dated Nov. 16, 2017.
Chinese Office Action for Application No. CN201610239130.X dated Aug. 2, 2017.
Chinese Office Action for Application No. CN201610239130.X dated Feb. 14, 2018.
Chinese Office Action for Application No. 201410383686.7 dated May 31, 2017.
Chinese Office Action for Application No. 201410799473.2, dated Oct. 12, 2018.
Chinese Office Action for Application No. CN201410182071.8 dated Mar. 1, 2017.
Decision of Rejection for Japanese Application No. 2014-243830, dated Mar. 18, 2020.
Decision of Rejection for Patent Application No. 2014-243827, dated Nov. 28, 2019.
Decision of Rejection for Chinese Application No. 2015103905202.2, dated Nov. 5, 2019.
European Search Report for European Application No. 14196406.4, dated Sep. 23, 2015.
European Search Report for EP Application No. 14196408.0, dated Nov. 24, 2015.
European Search Report in Application No. 12862174.5, dated Feb. 15, 2016.
European Search Report dated Dec. 2, 2015 for EP Application No. 14196408.0.
European search report for European Patent Application No. EP14196406 dated Oct. 2, 2015, 6 pages.
European Search Report published Nov. 4, 2015 in Application No. EP14196406.4.
Examination Report in European Application No. 17208183.8, dated Feb. 27, 2019.
Examination Report for European Application No. 14180106.8, dated Jun. 28, 2017.
Examination Report for European Application No. 17178867.2, dated Mar. 13, 2019.
Examination Report for European Application No. 13891327.2, dated Sep. 26, 2018.
Examination Report for European Application No. 16165112.0, dated Apr. 17, 2019.
Examination Report for European Application No. 16165112.0, dated Feb. 16, 2018.
Examination Report for European Patent Application No. 16154943.1, dated May 16, 2019.
Examination Report for European Patent Application No. 1720883.8, dated Oct. 29, 2019.
Extended European Search Report for European Patent Application No. EP 14166908 dated Jan. 7, 2015, 10 pages.
Extended European Search Report for Application No. EP14180106.8, dated Aug. 12, 2015.
Extended European Search Report for European Patent Application No. EP 14196409 dated May 31, 2016, 10pages.
Extended European Search Report for European Patent Application No. EP 16154943 dated Jun. 29, 2016, 9pages.
Extended European Search Report for European Patent Application No. EP 17178867 dated Nov. 2, 2017, 13pages.
Extended European Search Report for European Patent Application No. EP 18176358 dated Sep. 11, 2018, 11 pages.
Extended Search Report for European Application No. 14180106.8, dated Jul. 13, 2015.
Extented European search report for European Patent Application No. EP16165112 dated Sep. 6, 2016, 12 pages.
Fabien F., "Raspberry Pi + Mihini, Controlling an off-the-grid Electrical Installation, Part I," Apr. 11, 2014, XP055290314.
Generex Systems Gmbh, "SACS—Battery Analysis & Care System," Aug. 17, 2014, XP055290320.
International Search Report and Written Opinion for PCT/US2014/036368, dated Sep. 12, 2014.

(56) References Cited

OTHER PUBLICATIONS

International Search Report and Written Opinion dated May 12, 2014 in International Application# PCT/US2013/053721.
International Search Report and Written Opinion of the International Searching Authority dated Apr. 29, 2013, International Application No. PCT/US2012/072056.
International Search Report for Application No. PCT/US2013/053721 dated May 12, 2014.
"Introduction to Cryptography," NetWOrk Associates, Inc., PGP 6.5.1, 1990-1999, Retrieved@ [ftp:/!ftp.pgpi.org/pub/pgp/6.5/docs/english/IntroToCrypto.pdf] on Mar. 17, 2016, (refer to pp. 16-20).
Japanese Office Action for Application No. JP2014-550508 dated Sep. 15, 2017.
Keith S., et al. "Guide to Industrial Control Systems (ICS) Security," NIST, Special Publication 800-882, Jun. 2011, (refer to pp. 2-1 to 2-10).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Extended European Search Report in European Application No. 17208183.8, dated Jun. 22, 2018.
Notice of Reason for Rejection for Japanese Application No. 2016-080207, dated Jun. 4, 2020.
Notice of Reason for Rejection for Japanese Application No. 2014-243827, dated Jan. 24, 2019.
Office Action for Japanese Application No. 2020-135564, dated Mar. 8, 2022.
Emerson Process Management, "DeltaV Digital Automation System—System Overview," XP055402326, Jan. 1, 2009, pp. 1-40.
Extended European Search Report for 21187809.5, dated Nov. 29, 2021.
Office Action for Chinese Application No. 201910660260.4, dated Nov. 18, 2021.
Office Action for Japanese Application No. 2017-237592, dated Dec. 27, 2021.
Seimens AG, "ERTEC400—Enhanced Real-Time Ethernet Controller—Handbuch," XP002637652, Version 1.2.2, Jul. 31, 2010, pp. 1-98.
D. Dzung, M. Naedele, T. P. Von Hoff and M. Crevatin, "Security for Industrial Communication Systems," in Proceedings of the IEEE, vol. 93, No. 6, pp. 1152-1177, Jun. 2005, doi: 10.11 09/JPROC.2005.849714. (Year: 2005).
Decision of Rejection for Chinese Application No. 201711349441.2, dated Jun. 23, 2022.
Notice of Preliminary Rejection for Korean Application No. 10-2016-0015889, dated Jul. 6, 2022.
Office Action for Japanese Application No. 2020-135564, dated Sep. 14, 2022.
Office Action for Japanese Application No. 2021-112729, dated Jun. 27, 2022.
Office Action for Japanese Application No. 2021-117572, dated Oct. 14, 2022.
Reasons for Rejection for Japanese Applicatino No. 2021-138773, dated Jun. 29, 2022.
Office Action in Japan for Application No. 2021-160356, dated Dec. 16, 2022.
Notice of Reason for Rejection for Patent Application No. 2022-002389, dated Nov. 25, 2022.
Notice of Reasons for Rejection for Japanese Patent Application No. 2021-148592, dated Oct. 28, 2022.
Decision of Rejection for Japanese Patent Application No. 2021-112729, dated Feb. 6, 2023.
Office Action for Chinese Patent Application No. 201711349441.2, dated Mar. 20, 2023.
Notice of Preliminary Rejection for Korean Application No. 10-2016-0045717, dated Apr. 18, 2023.
Notice of Reason for Rejection for Patent Application No. 2022-002389, dated Mar. 17, 2023.

\* cited by examiner

INDUSTRIAL CONTROL SYSTEM CABLE

CROSS-REFERENCE TO RELATED APPLICATIONS

The present application is a continuation under 35 U.S.C. § 120 of U.S. patent application Ser. No. 14/446,412, filed Jul. 30, 2014, and titled "INDUSTRIAL CONTROL SYSTEM CABLE," which itself claims the benefit under 35 U.S.C. § 119(e) of U.S. Provisional Application Ser. No. 62/021,438, filed Jul. 7, 2014, and titled "INDUSTRIAL CONTROL SYSTEM CABLE." The present application is also a continuation-in-part of International Application No. PCT/US2013/053721, filed Aug. 6, 2013, and titled, "SECURE INDUSTRIAL CONTROL SYSTEM." U.S. patent application Ser. No. 14/446,412 and U.S. Provisional Application Ser. No. 62/021,438 and International Application No. PCT/US2013/053721 are herein incorporated by reference in their entireties.

BACKGROUND

Industrial and process control systems include various types of control equipment used in industrial production, such as Supervisory Control and Data Acquisition (SCADA) systems, Distributed Control Systems (DCS), and other control equipment using, for example, Programmable Logic Controllers (PLC). These control systems are typically used in industries including electrical, water, oil, gas, and data. Using information collected from remote stations in the field, automated and/or operator-driven supervisory commands can be transmitted to field control devices. These field devices control local operations, such as opening and closing valves and breakers, collecting data from sensor systems, and monitoring a local environment for alarm conditions.

For example, SCADA systems typically use open-loop control with sites that may be widely separated geographically, using potentially unreliable or intermittent low-bandwidth/high-latency links. These systems use Remote Terminal Units (RTUs) to send supervisory data to a control center. The RTUs may have a limited capacity for local controls when the master station is not available. DCS systems are generally used for real time data collection and control with high-bandwidth, low-latency data networks. PLCs typically provide Boolean logic operations, timers, continuous control, and so on. However, as industrial control systems evolve, new technologies are combining aspects of these various types of control systems. For instance, Programmable Automation Controllers (PACs) can include aspects of SCADA, DCS, and PLCs.

SCADA systems can be used with industrial processes, including manufacturing, production, power generation, fabrication, and refining. They can also be used with infrastructure processes, including water treatment and distribution, wastewater collection and treatment, oil and gas pipelines, electrical power transmission and distribution, wind forms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

SUMMARY

A cable includes a wiring assembly with a knuckle and wires bundled together by a sleeve. The cable also includes a connector assembly with a connector having connections for the wires, where the connections are arranged along a longitudinal axis. The connector assembly captures an end of the wiring assembly, and the knuckle of the wiring assembly is pivotally connected to the connector assembly so that the wiring assembly can articulate with respect to the connector assembly in a plane defined by the longitudinal axis of the connector and the end of the wiring assembly. In some embodiments, the connector assembly and the knuckle form a decent to arrest movement of the wiring assembly with respect to the connector assembly. In some embodiments, one or more of the connections is a keyed connection.

A cable includes a wiring assembly with wires bundled together by a sleeve. The cable also includes a connector assembly with a connector having connections for the wires, where the connector assembly captures an end of the wiring assembly. The cable further includes circuitry configured to authenticate the cable to a device connected to the cable by the connector and/or to authenticate the device connected to the cable by the connector. In some embodiments, the circuitry stores a unique identifier and/or a security credential associated with the cable. The circuitry can be configured to establish and/or prevent connection to the device connected to the cable based upon the authentication. The circuitry can also be configured to encrypt communication between the cable and the device. The cable can also include an indicator (e.g., an indicator light) to indicate the authentication.

A control system includes a first control element or subsystem coupled with a backplane, a first cable configured to connect to the first control element or subsystem, a second control element or subsystem coupled with the backplane adjacent to the first control element or subsystem, and a second cable configured to connect to the second control element or subsystem. Each one of the first cable and the second cable includes a wiring assembly with a knuckle and wires bundled together by a sleeve. Each cable also includes a connector assembly with a connector having connections for the wires, where the connections are arranged along a longitudinal axis. The connector assembly captures an end of the wiring assembly, and the knuckle of the wiring assembly is pivotally connected to the connector assembly so that the wiring assembly can articulate with respect to the connector assembly in a plane defined by the longitudinal axis of the connector and the end of the wiring assembly. In this manner, respective connector assemblies of the first cable and the second cable are configured to connect to the first control element or subsystem and the second control element or subsystem so that respective wiring assemblies of the first cable and the second cable can articulate to be parallel to the longitudinal axis of each respective connector. The backplane can be, for instance, a power backplane or a communications backplane.

A control system includes a first control element or subsystem coupled with a backplane, a first cable configured to connect to the first control element or subsystem, a second control element or subsystem coupled with the backplane adjacent to the first control element or subsystem, and a second cable configured to connect to the second control element or subsystem. Each one of the first cable and the second cable includes a wiring assembly with wires bundled together by a sleeve and a connector assembly with a connector having connections for the wires, where the connector assembly captures an end of the wiring assembly. Each cable includes circuitry configured to authenticate respective ones of the first cable and the second cable to the first control element or subsystem and the second control element or subsystem and/or to authenticate the first control element or subsystem and the second control element or subsystem to respective ones of the first cable and the second cable.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
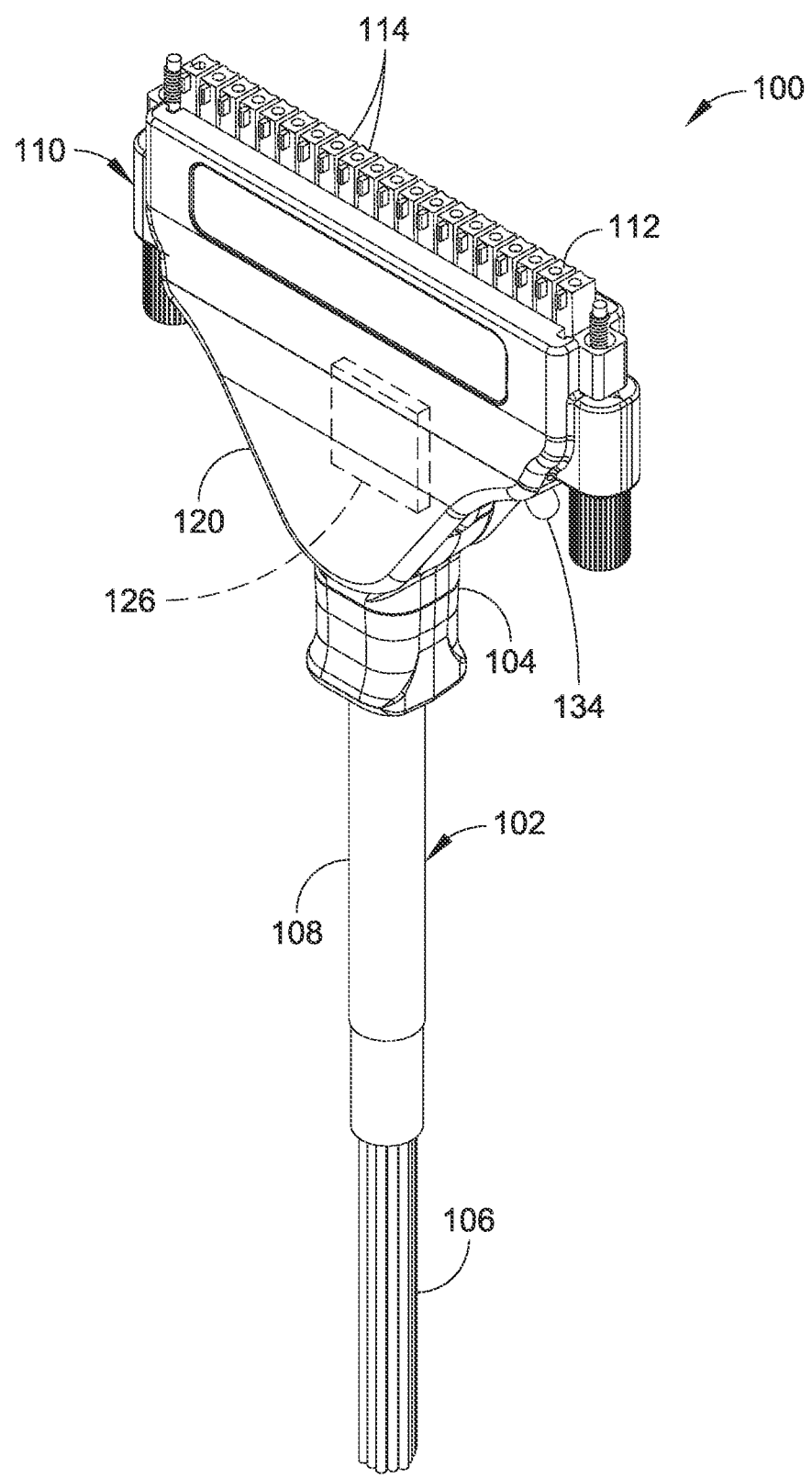
FIG. 1 is a partial isometric view illustrating a cable in accordance with example embodiments of the present disclosure.

In industrial and process control systems, many different cable configurations are generally used to interconnect automation equipment, such as controllers, input/output (I/O) modules, and so forth. For example, a cable with heavier gauge wire is used to connect a power supply to a power grid, while a cable with lighter gauge wire is used to connect an I/O module to a field device. Further, each type of device may use different numbers of wires, different pin layouts, and so forth. For this reason, there is typically a separate cable or cable type used for each piece of automation equipment, which can lead to tracking and inventorying a large number of different cable types. In the event of a cable failure, the proper cable must be identified, located, and properly installed. This can require storing and inventorying an extensive array of different cables, which can increase the expense and/or complexity associated with such equipment. Furthermore, not having an appropriate cable in inventory can lead to production delays, loss of revenue, and so forth.

The present disclosure is directed to apparatus, systems, and techniques for providing a cable that can be used with multiple industrial and process control system equipment devices. Furthermore, cables described herein can be positioned so that the cables can be placed in a variety of orientations within the confines of a cabinet, a rack, or another space with limited interior volume. For example, a cable includes a connector assembly having detents that allow the end of the cable proximate to a connector to "click" into various positions (e.g., a horizontal position, a vertical position, an intermediate position, and so forth). In some embodiments, a cable includes a wiring assembly with a symmetrical layout so that the cable can be connected to a device in various orientations. Further, a cable can include one or more keyed connections (e.g., tongue and groove keying, reversed keying, etc.) to ensure that the cable is connected in a desired orientation with respect to a device (e.g., with mating keyed connections).

In some embodiments, different devices that connect to a cable each have the same number of channels (e.g., ten (10) channels, twenty (20) channels, and so forth), and each cable is group isolated (e.g., using each conductor and one as a common ground). In this manner, each device (e.g., controllers, input/output (I/O) modules, and so on) can have a common (e.g., universal) input/output count. Further, the wires in a cable can be oversized for one particular application (e.g., a low voltage application) so that the cable can be used for another application (e.g., a high voltage application). For example, each cable can be rated for at least approximately two amperes (2 amps). However, this amperage is provided by way of example and is not meant to limit the present disclosure. In other embodiments, the cables can be rated for more than two amperes (2 amps), less than two amperes (2 amps), and so on.

In some embodiments, an electronically active cable (e.g., employing a microprocessor, an embedded state machine, and so on) is provided, which has circuitry (e.g., a printed circuit board (PCB), an integrated circuit (IC) chip, and/or other circuitry) that can perform an authentication of the cable and/or a device connected to the cable. This can prevent or minimize the potential for plugging a cable into a device not intended to be used with that particular cable or type of cable (e.g., preventing or minimizing the possibility that a low voltage cable is plugged into a high voltage device). For example, the cable performs a "handshake" operation with a coupled module to verify that the cable is mated with an appropriate and/or desired device. In some embodiments, an indicator, such as a light emitting diode (LED) indicator light, is used to provide notification of this authentication. For instance, a multi-colored LED and/or a single color LED provides diagnostic information to indicate the status of an authentication (e.g., using a solid glow, no glow, blinking, one color for one state and another color for another state, etc.).

In some embodiments, the cable can be used to authenticate a field device, such as an instrument connected to the cable using a terminal block connection. For instance, cable circuitry can be used to authenticate an instrument, a type of instrument, the manufacturer of an instrument, and so on. In this manner, the use of counterfeit equipment in an industrial automation setting can be prevented or minimized. Further, the cable can be used to authenticate itself to equipment, such as controllers, input/output (I/O) modules, end devices, field devices, and so forth. In some embodiments, the cable facilitates cryptographic communication between the cable and a device connected to the cable. For example, a cable can provide bi-directional cryptographic communications between the cable and end devices, field devices, and so on. Further, in some embodiments, an operator can use a cable connected to a network to obtain authentication information about a field device, such as an instrument.

Example Implementations

Figure 2:
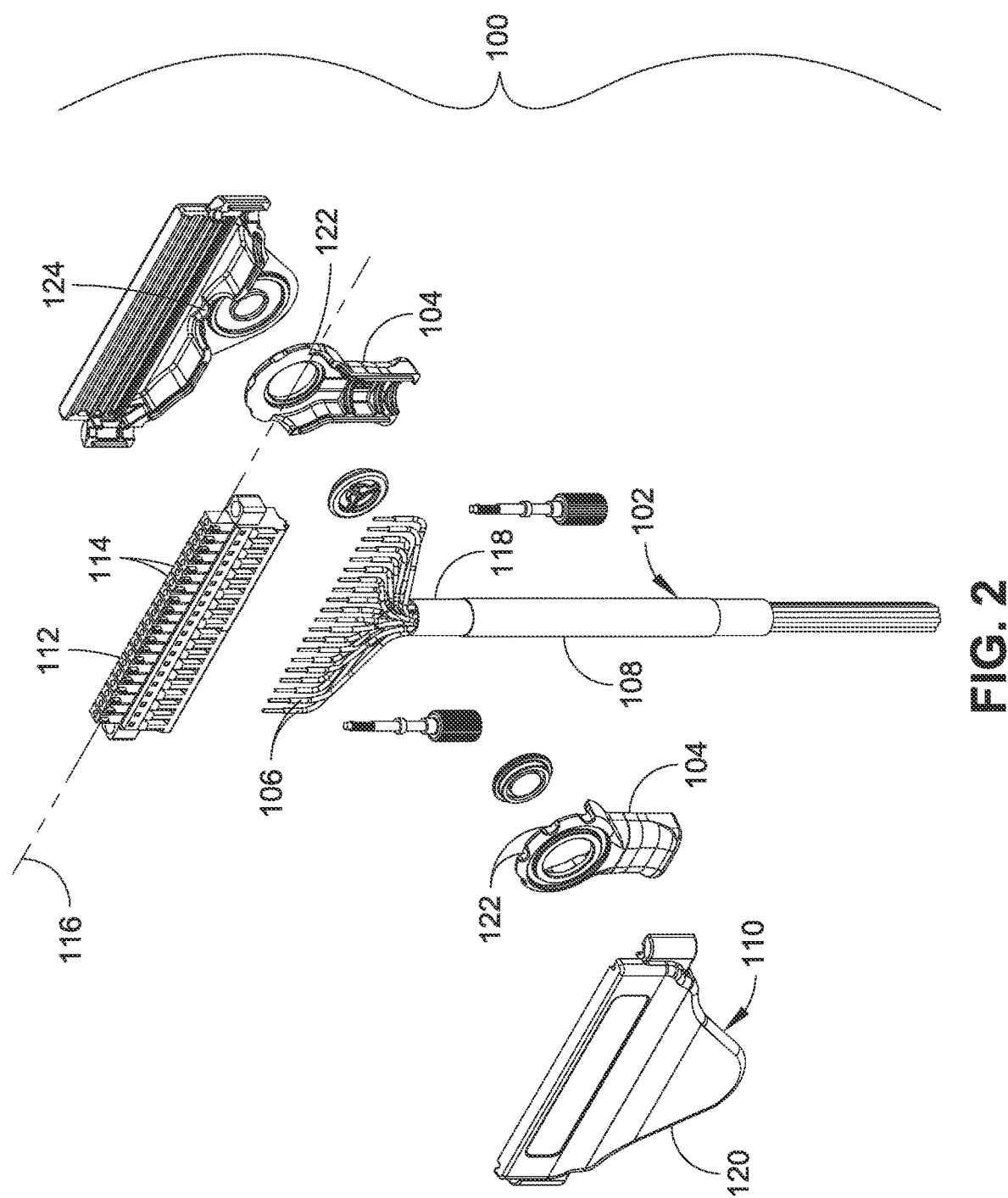
FIG. 2 is a partial exploded isometric view illustrating a cable in accordance with example embodiments of the present disclosure.
Figure 3:
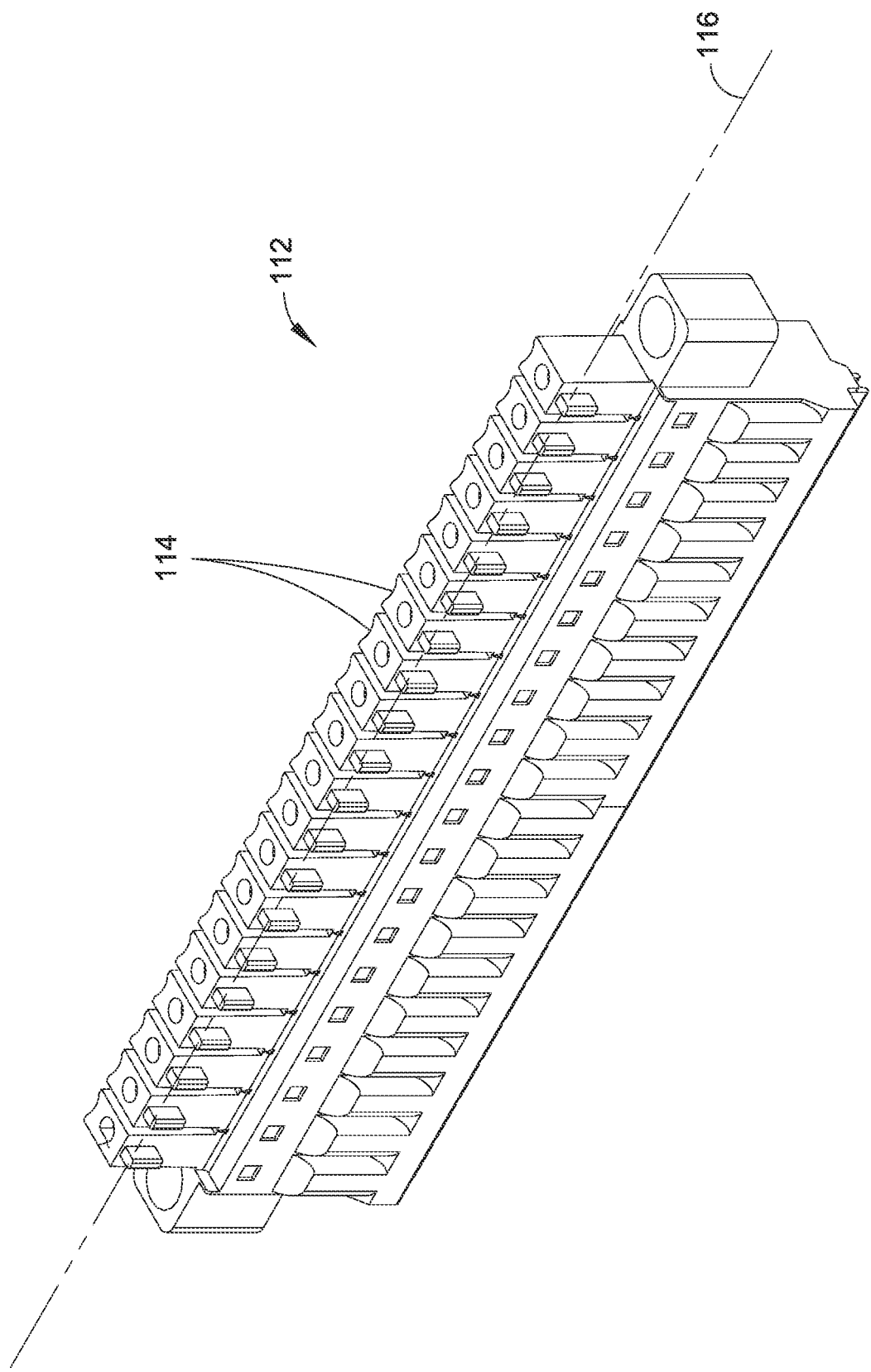
FIG. 3 is an isometric view illustrating a connector for a cable, such as the cable illustrated in FIG. 2, in accordance with example embodiments of the present disclosure.
Figure 4A:
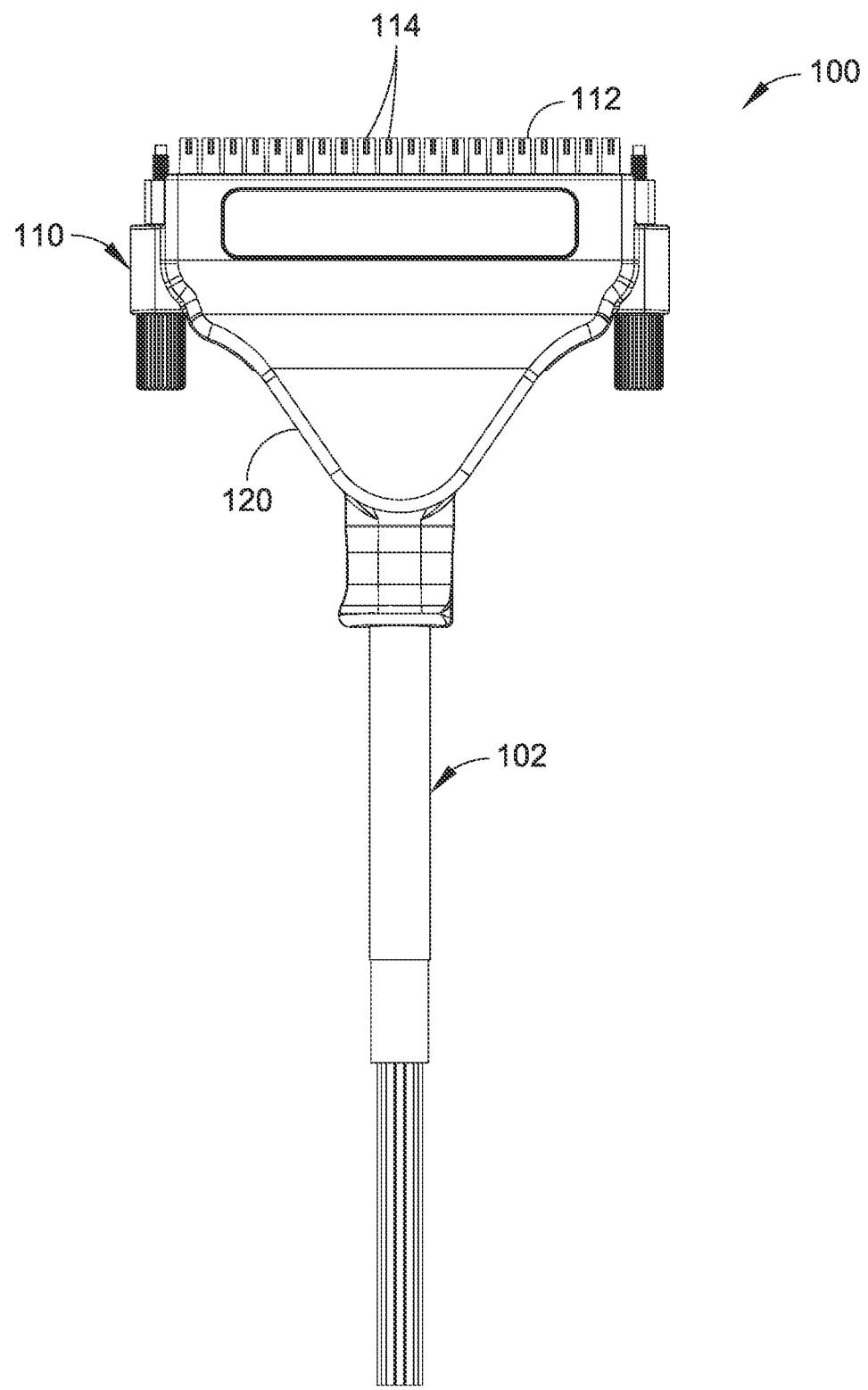
FIG. 4A is a partial end view of the cable illustrated in FIG. 2, where a wiring assembly is articulated with respect to a connector assembly to a first position.
Figure 4B:
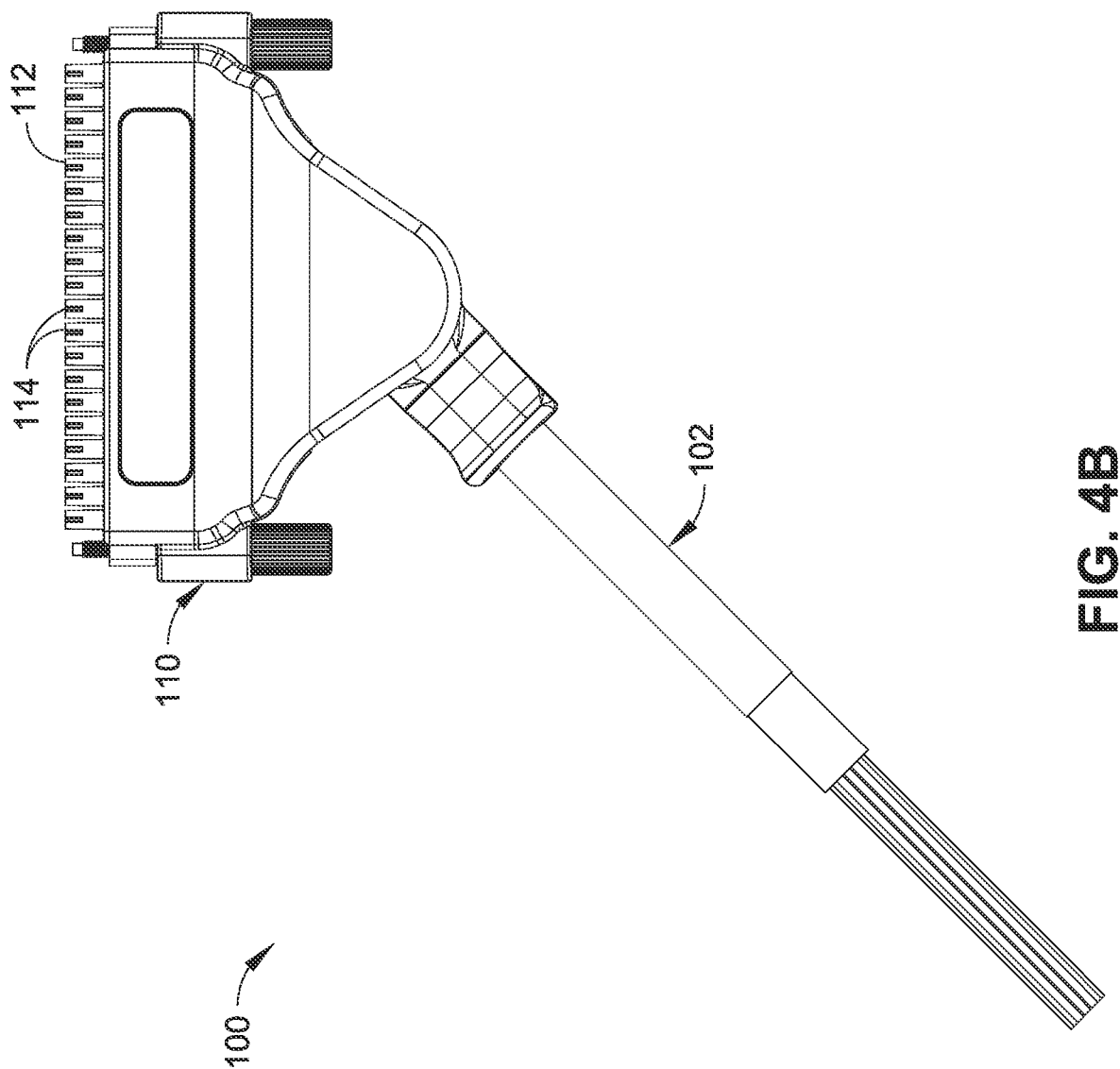
FIG. 4B is a partial end view of the cable illustrated in FIG. 2, where a wiring assembly is articulated with respect to a connector assembly to a second position.
Figure 4C:
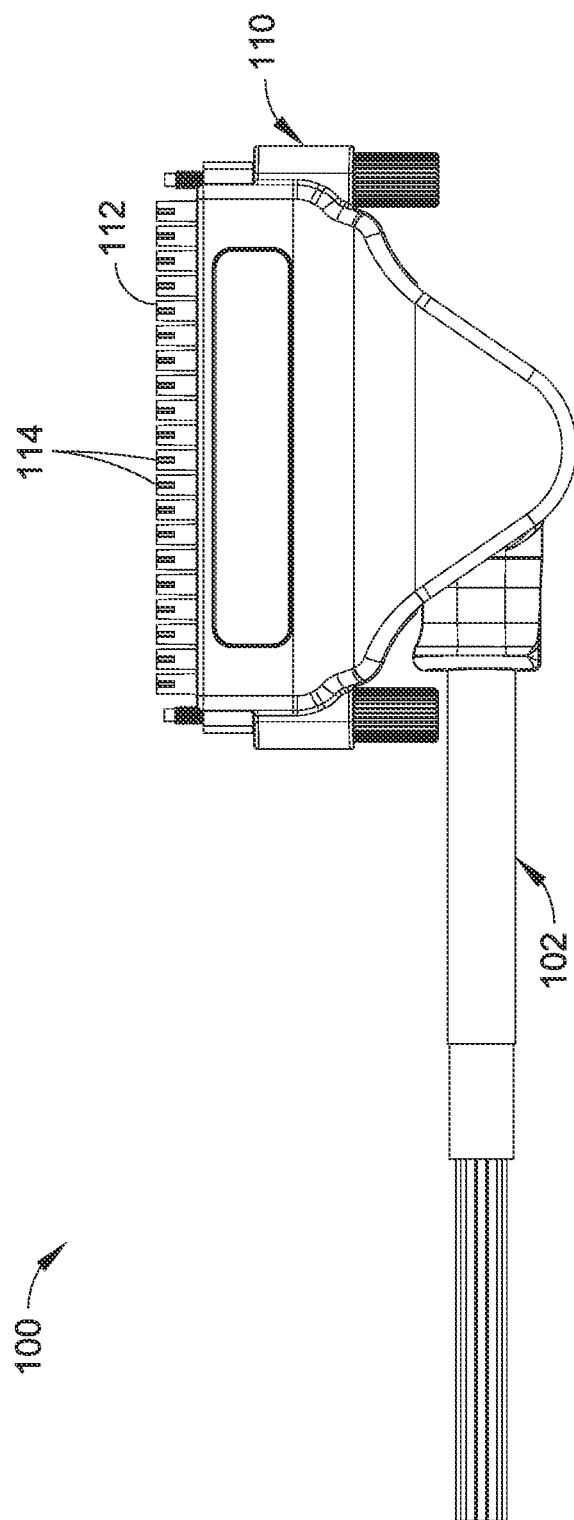
FIG. 4C is a partial end view of the cable illustrated in FIG. 2, where a wiring assembly is articulated with respect to a connector assembly to a third position.

Referring now to FIGS. 1 through 8, cables 100 are described. The cables 100 include a wiring assembly 102 with a knuckle 104 and wires 106 bundled together by a sleeve 108. In some embodiments, the knuckle 104 is disposed about the sleeve 108. For example, the knuckle 104 is formed in two parts that are captured by a connector housing (e.g., as shown in FIG. 2). In other embodiments, the knuckle 104 is integrally formed with the sleeve 108 (e.g., molded as part of the sleeve 108, co-molded with the sleeve 108, and so on). The cable 100 also includes a connector assembly 110 with a connector 112 having connections 114 for the wires 106. In some embodiments, one or more of the connections 114 is a keyed connection. The connections 114 are arranged along a longitudinal axis 116 (e.g., as shown in FIG. 3). The connector assembly 110 captures an end 118 of the wiring assembly 102, and the knuckle 104 of the wiring assembly 102 is pivotally connected to the connector assembly 110 so that the wiring assembly 102 can articulate with respect to the connector assembly 110 in a plane defined by the longitudinal axis 116 of the connector 112 and the end 118 of the wiring assembly 102 (e.g., as shown in FIGS. 4A through 4C). In some embodiments, the connector assembly 110 comprises a connector housing 120 that captures the wiring assembly 102.

The connector assembly 110 and the knuckle 104 can include one or more detents to arrest movement of the wiring assembly 102 with respect to the connector assembly 110. For example, the knuckle 104 includes one or more notches 122 configured to interface with one or more corresponding teeth 124 of the connector assembly 110 (e.g., as shown in FIG. 2). However, this configuration is provided by way of example and is not mean to limit the present disclosure. In other embodiments, one or more notches of the connector assembly 110 can be configured to interface with one or more corresponding teeth of the knuckle 104. Further, other mechanisms for arresting movement of the wiring assembly 102 with respect to the connector assembly 110 can be provided, including, but not necessarily limited to: a gravity-actuated lever, a spring-actuated lever, a spring-loaded ball bearing, a leaf spring (e.g., a piece of spring steel), and so forth.

Figure 5:
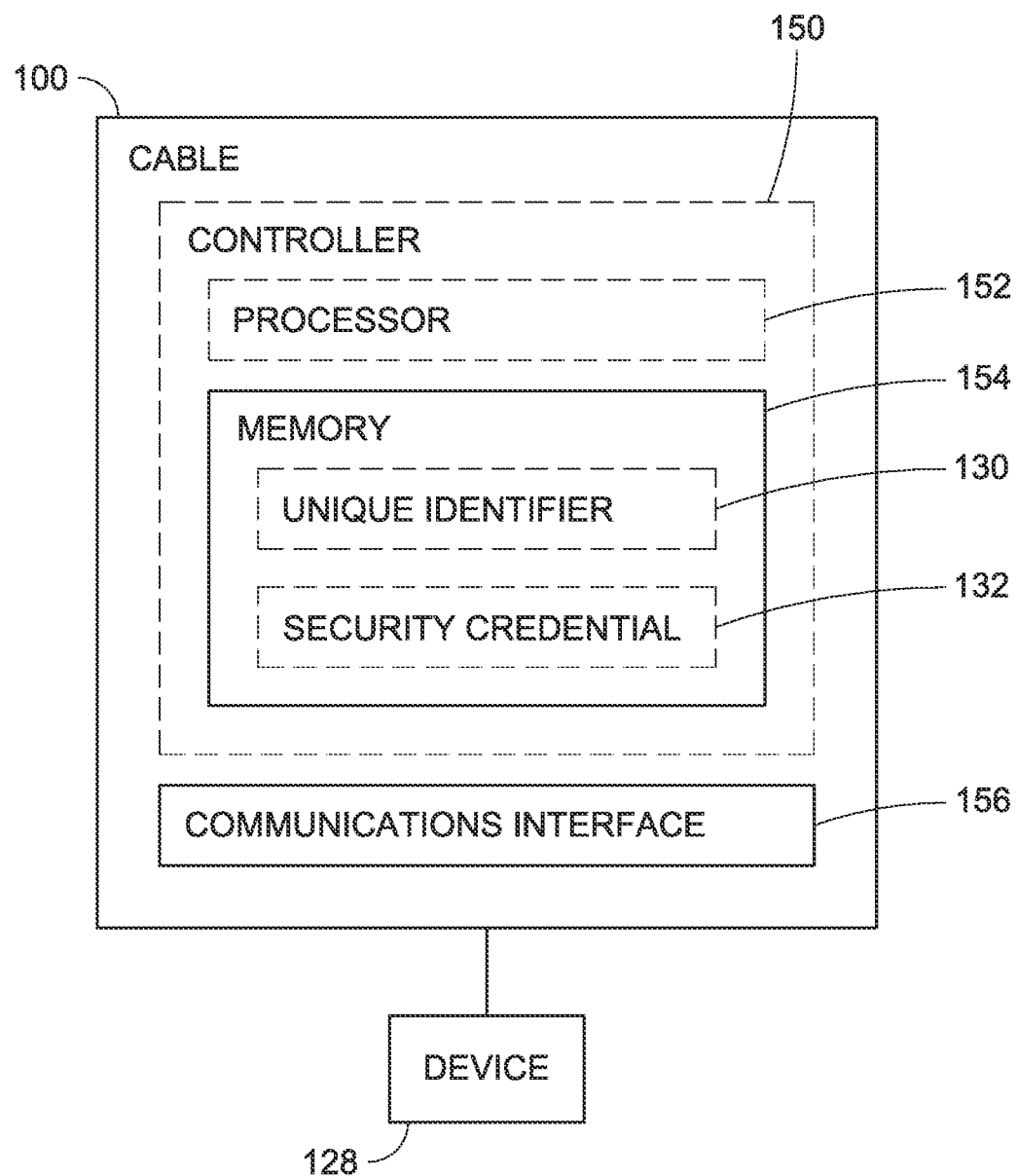
FIG. 5 is a diagrammatic illustration of a cable, such as the cable illustrated in FIG. 1, where the cable is connected to a device in accordance with example embodiments of the present disclosure.

In some embodiments, the cable 100 includes circuitry 126 configured to authenticate the cable 100 to a device 128 connected to the cable 100 by the connector 112 and/or by another connector, such as another connector on the other end of the cable 100. The circuitry 126 can also be used to authenticate the device 128 connected to the cable 100 by the connector 112 and/or by another connector, such as another connector on the other end of the cable 100. In some embodiments, the circuitry 126 stores a unique identifier 130 and/or a security credential 132 associated with the cable 100 (e.g., as shown in FIG. 5). The circuitry 126 can be configured to establish and/or prevent connection to the device 128 connected to the cable 100 based upon the authentication. The cable 100 can also include an indicator (e.g., an indicator light 134) to indicate the authentication.

In some embodiments, the cable 100 includes an alert module. In embodiments of the disclosure, the alert module is configured to provide an alert (e.g., to an operator) when a condition and/or set of conditions is met for the cable 100 and/or a device 128 connected to the cable 100. For example, an alert is generated by circuitry 126 when authentication of the cable 100 and/or a device 128 connected to the cable is obtained and/or fails. For example, a cable 100 performs a "handshake" operation with a coupled device 128 to verify that the cable 100 is mated with an appropriate and/or desired device. If not, the alert module can be used to alert an operator (e.g., via a network). In some embodiments, an alert is provided to an operator in the form of an email. In other embodiments, an alert is provided to an operator in the form of a text message. However, these alerts are provided by way of example and are not meant to limit the present disclosure. In other embodiments, different alerts are provided to an operator. Further, multiple alerts can be provided to an operator when a condition is met for an authentication procedure (e.g., an email and a text message, and so forth). It should also be noted that alerts can be provided by circuitry 126 for other conditions, including, but not necessarily limited to: cable failure, connected device failure, various error conditions for a cable and/or a connected device, and so forth.

Figure 6:
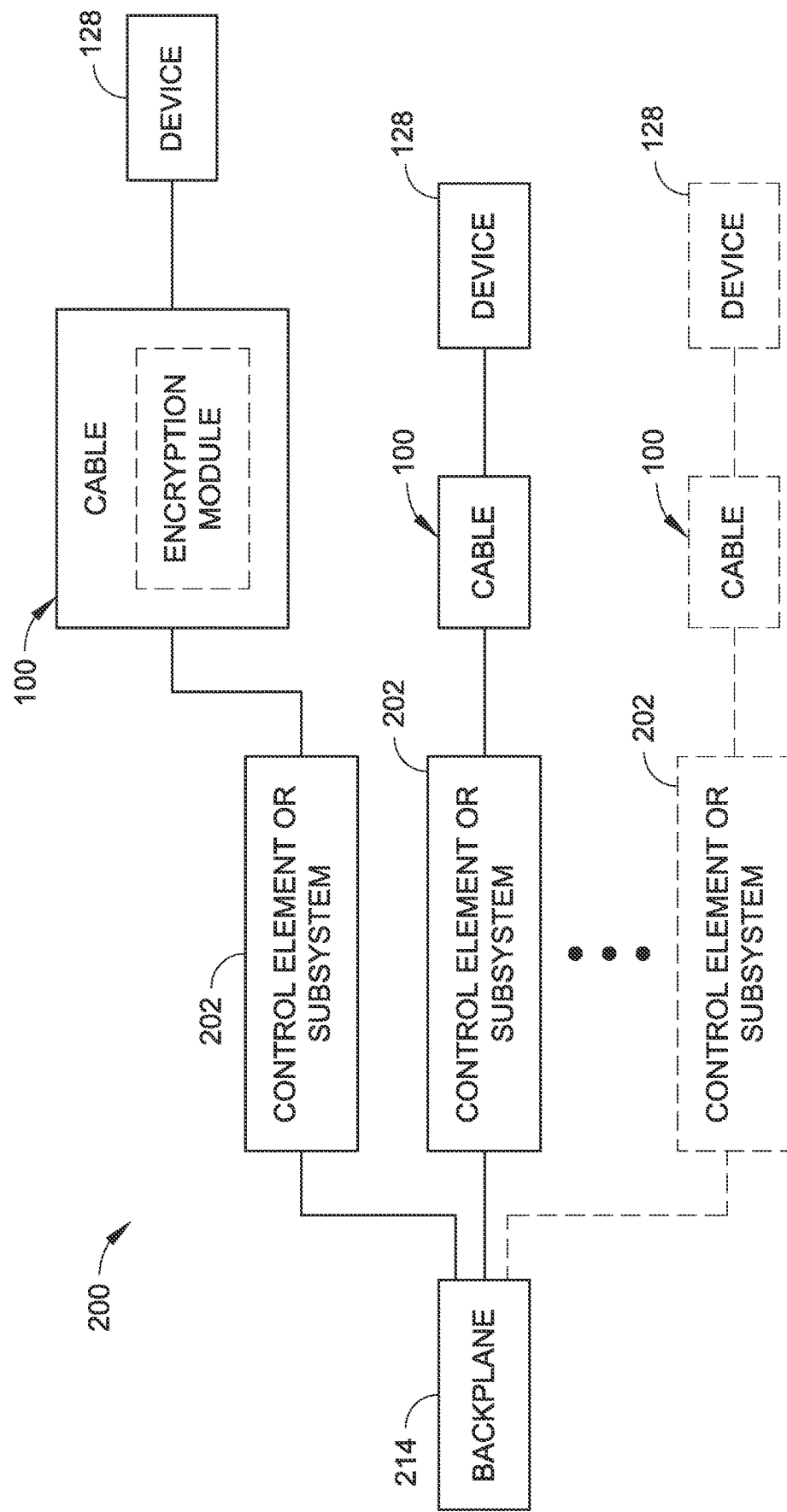
FIG. 6 is a diagrammatic illustration of cables, such as the cable illustrated in FIG. 1, deployed in a control system environment in accordance with example embodiments of the present disclosure.

The circuitry 126 can also be configured to encrypt communication between the cable 100 and the device 128. As shown in FIG. 6, a cable 100 can include an encryption module 136. For example, one or more cryptographic protocols are used to transmit information between the cable 100 and a device 128. Examples of such cryptographic protocols include, but are not necessarily limited to: a transport layer security (TLS) protocol, a secure sockets layer (SSL) protocol, and so forth. For instance, communications between a cable 100 and a device 128 can use HTTP secure (HTTPS) protocol, where HTTP protocol is layered on SSL and/or TLS protocol.

The cables 100 can be used with a process control system 200. In embodiments of the disclosure, the process control system 200 uses a communications control architecture to implement a distributed control system that includes control elements or subsystems 202, where the subsystems are controlled by one or more controllers distributed throughout the system. For example, one or more I/O modules 204 are connected to one or more control modules 206. The process control system 200 is configured to transmit data to and from the I/O modules 204. The I/O modules 204 can comprise input modules, output modules, and/or input and output modules. For instance, input modules can be used to receive information from input instruments in the process or the field, while output modules can be used to transmit instructions to output instruments in the field. For example, an I/O module 204 can be connected to a process sensor, such as a sensor for measuring pressure in piping for a gas plant, a refinery, and so forth.

In implementations, the I/O modules 204 can be used to control systems and collect data in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, an I/O module 204 can be configured to convert analog data received from the sensor to digital data (e.g., using Analog-to-Digital Converter (ADC) circuitry, and so forth). An I/O module 204 can also be connected to a motor and configured to control one or more operating characteristics of the motor, such as motor speed, motor torque, and so forth. Further, the I/O module 204 can be configured to convert digital data to analog data for transmission to the motor (e.g., using Digital-to-Analog (DAC) circuitry, and so forth). In implementations, one or more of the I/O modules 204 can comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more I/O modules 204 can be used to provide fault tolerant and redundant connections for a communications sub-bus.

Each I/O module 204 can be provided with a unique identifier (ID) for distinguishing one I/O module 204 from another I/O module 204. In implementations, an I/O module 204 is identified by its ID when it is connected to the process control system 200. Multiple I/O modules 204 can be used with the process control system 200 to provide redundancy. For example, two or more I/O modules 204 can be connected to the sensor and/or the motor. Each I/O module 204 can include one or more ports that furnish a physical connection to hardware and circuitry included with the I/O module 204, such as a printed circuit board (PCB), and so forth. For example, each I/O module 204 includes a connection for a cable 100 that connects the cable 100 to a printed wiring board (PWB) in the I/O module 204.

One or more of the I/O modules 204 can include an interface for connecting to other networks including, but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 204 can include a connection for connecting an I/O module 204 to a computer bus, and so forth.

The control modules 206 can be used to monitor and control the I/O modules 204, and to connect two or more I/O modules 204 together. In embodiments of the disclosure, a control module 206 can update a routing table when an I/O module 204 is connected to the process control system 200 based upon a unique ID for the I/O module 204. Further, when multiple redundant I/O modules 204 are used, each control module 206 can implement mirroring of informational databases regarding the I/O modules 204 and update them as data is received from and/or transmitted to the I/O modules 204. In some implementations, two or more control modules 206 are used to provide redundancy.

Data transmitted by the process control system 200 can be packetized, i.e., discrete portions of the data can be converted into data packets comprising the data portions along with network control information, and so forth. The process control system 200 can use one or more protocols for data transmission, including a bit-oriented synchronous data link layer protocol such as High-Level Data Link Control (HDLC). In some embodiments, the process control system 200 implements HDLC according to an International Organization for Standardization (ISO) 13239 standard, or the like. Further, two or more control modules 206 can be used to implement redundant HDLC. However, it should be noted that HDLC is provided by way of example only and is not meant to be restrictive of the present disclosure. Thus, the process control system 200 can use other various communications protocols in accordance with the present disclosure.

One or more of the control modules 206 can be configured for exchanging information with components used for monitoring and/or controlling the instrumentation connected to the process control system 200 via the I/O modules 204, such as one or more control loop feedback mechanisms/controllers. In implementations, a controller can be configured as a microcontroller/Programmable Logic Controller (PLC), a Proportional-Integral-Derivative (PID) controller, and so forth. In embodiments of the disclosure, the I/O modules 204 and the control modules 206 include network interfaces, e.g., for connecting one or more I/O modules 204 to one or more controllers via a network. In implementations, a network interface can be configured as a Gigabit Ethernet interface for connecting the I/O modules 204 to a Local Area Network (LAN). Further, two or more control modules 206 can be used to implement redundant Gigabit Ethernet.

However, it should be noted that Gigabit Ethernet is provided by way of example only and is not meant to be restrictive of the present disclosure. Thus, a network interface can be configured for connecting the control modules 206 to other various networks including, but not necessarily limited to: a wide-area cellular telephone network, such as a 3G cellular network, a 4G cellular network, or a GSM network; a wireless computer communications network, such as a Wi-Fi network (e.g., a WLAN operated using IEEE 802.11 network standards); a PAN (e.g., a WPAN operated using IEEE 802.15 network standards); a WAN; an intranet; an extranet; an internet; the Internet; and so on. Additionally, a network interface can be implemented using a computer bus. For example, a network interface can include a Peripheral Component Interconnect (PCI) card interface, such as a Mini PCI interface, and so forth. Further, the network can be configured to include a single network or multiple networks across different access points.

The process control system 200 can receive electrical power from multiple sources. For example, AC power is supplied from a power grid 208 (e.g., using high voltage power from AC mains). AC power can also be supplied using local power generation (e.g., an on-site turbine or diesel local power generator 210). A power supply 212 is used to distribute electrical power from the power grid 208 to automation equipment of the process control system 200, such as controllers, I/O modules, and so forth. A power supply 212 can also be used to distribute electrical power from the local power generator 210 to the automation equipment. The process control system 200 can also include additional (backup) power supplies configured to store and return DC power using multiple battery modules. For example, a power supply 212 functions as a UPS. In embodiments of the disclosure, multiple power supplies 212 can be distributed (e.g., physically decentralized) within the process control system 200.

Figure 7:
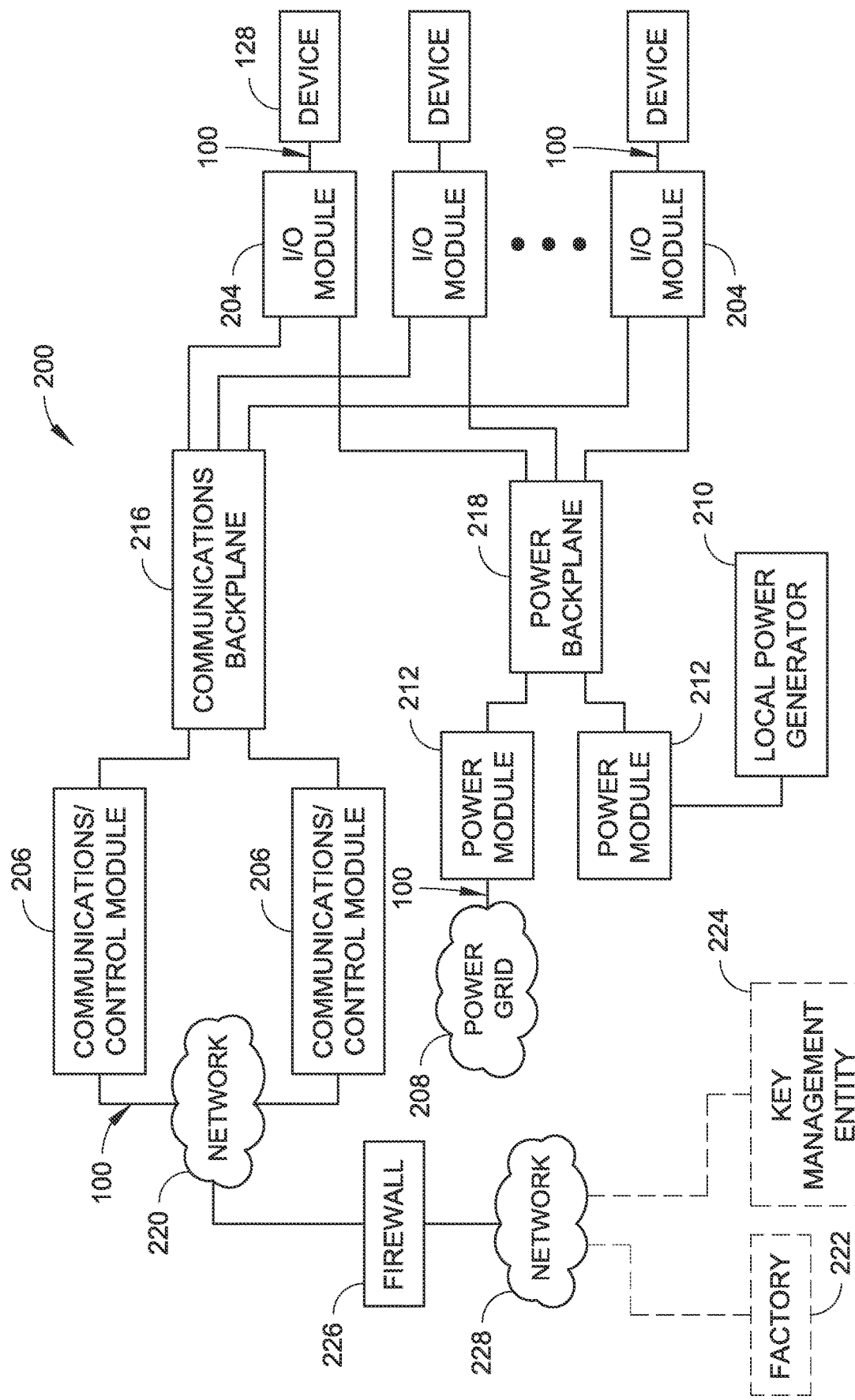
FIG. 7 is a diagrammatic illustration of a process control system, where cables, such as the cable illustrated in FIG. 1, are used to connect to devices in accordance with example embodiments of the present disclosure.

In embodiments of the disclosure, the control elements or subsystems 202 (e.g., the I/O modules 204, the control modules 206, the power supplies 212, and so forth) are connected together by one or more backplanes 214. For example, as shown in FIG. 7, control modules 206 can be connected to 110 modules 204 by a communications backplane 216. Further, power supplies 212 can be connected to I/O modules 204 and/or to control modules 206 by a power backplane 218. In embodiments of the disclosure, cables 100 are used to connect to the I/O modules 204, the control modules 206, the power supplies 212, and possibly other process control system equipment. For example, a cable 100 is used to connect a control module 206 to a network 220, another cable 100 is used to connect a power supply 212 to a power grid 208, another cable 100 is used to connect a power supply 212 to a local power generator 210, and so forth.

Figure 8:
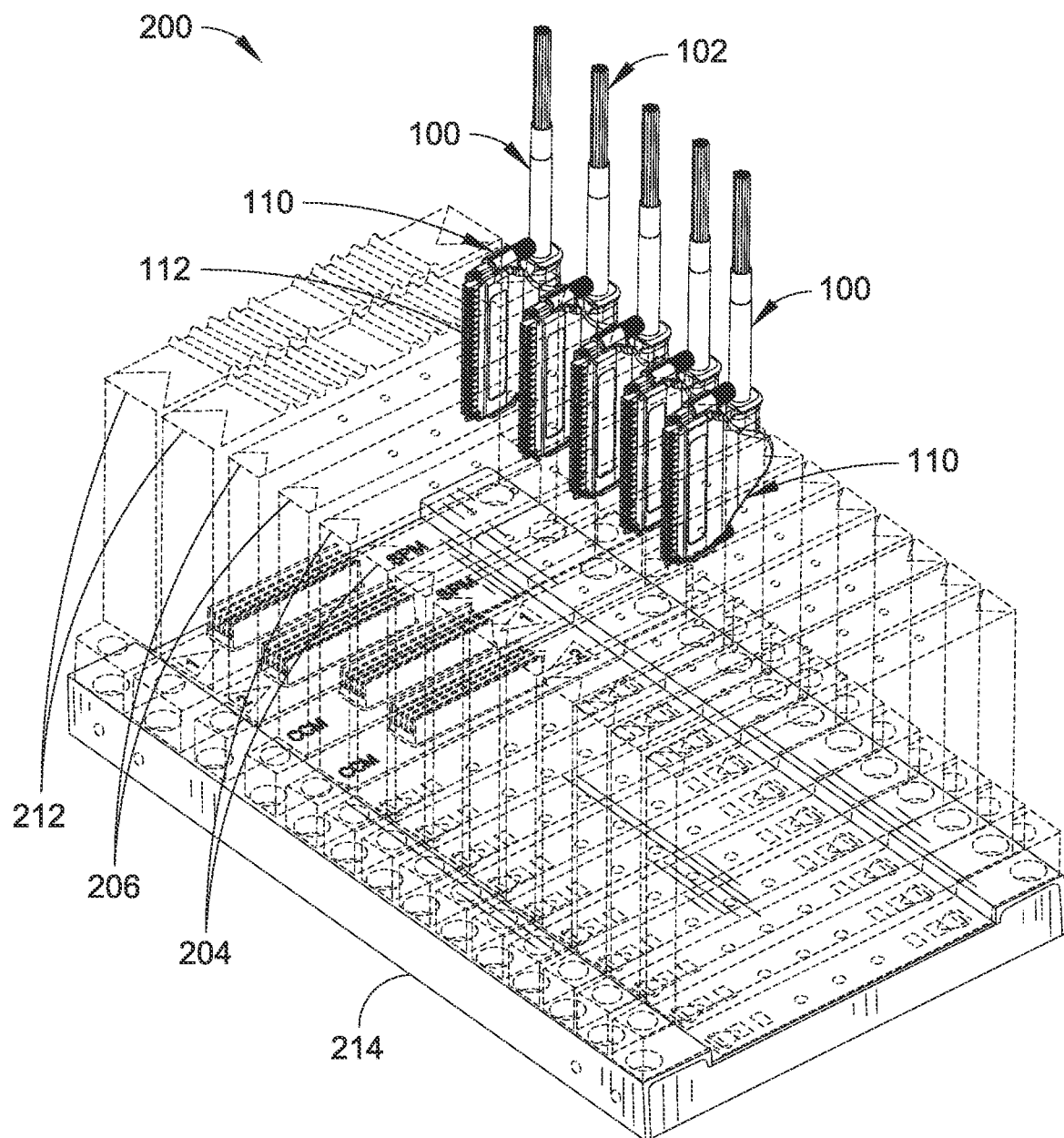
FIG. 8 is an isometric view illustrating cables, such as the cable illustrated in FIG. 1, connected to devices arranged adjacent to one another on a backplane in accordance with example embodiments of the present disclosure.

In some embodiments, the I/O modules 204, the control modules 206, and/or the power supplies 212 can be positioned adjacent to one another (e.g., immediately adjacent to one another as shown in FIG. 8). As shown, connector assemblies 110 of the first cables 100 are connected to the control elements or subsystem 204, 206, and 212 so that respective wiring assemblies 102 of the cables 100 can articulate to be parallel to the longitudinal axis of each respective connector 112. Further, as previously described, each cable 100 can include circuitry configured to authenticate the cables 100 to the first control elements or subsystem 204, 206, and 212 and/or to authenticate the control elements or subsystem 204, 206, and 212 to respective cables 100.

Referring now to FIG. 5, a cable 100, including some or all of its components, can operate under computer control. For example, a processor can be included with or in a cable 100 to control the components and functions of cables 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the cables 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The cable 100 can include a controller 150 for controlling authentication operations, encryption, cryptographic communications, and so forth. The controller 150 can include a processor 152, a memory 154, and a communications interface 156. The processor 152 provides processing functionality for the controller 150 and can include any number of processors, micro-controllers, or other processing systems, and resident or external memory for storing data and other information accessed or generated by the controller 150. The processor 152 can execute one or more software programs that implement techniques described herein. The processor 152 is not limited by the materials from which it is formed or the processing mechanisms employed therein and, as such, can be implemented via semiconductor(s) and/or transistors (e.g., using electronic integrated circuit (IC) components), and so forth.

The memory 154 is an example of tangible, computer-readable storage medium that provides storage functionality to store various data associated with operation of the controller 150, such as software programs and/or code segments, or other data to instruct the processor 152, and possibly other components of the controller 150, to perform the functionality described herein. Thus, the memory 154 can store data, such as a program of instructions for operating the cable 100 (including its components), and so forth. In embodiments of the disclosure, the memory 154 can store a unique identifier 130 and/or a security credential 132 for the cable 100. It should be noted that while a single memory 154 is described, a wide variety of types and combinations of memory (e.g., tangible, non-transitory memory) can be employed. The memory 154 can be integral with the processor 152, can comprise stand-alone memory, or can be a combination of both.

The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the cable 100 and/or the memory 154 can include removable integrated circuit card (ICC) memory, such as memory provided by a subscriber identity module (SIM) card, a universal subscriber identity module (USIM) card, a universal integrated circuit card (UICC), and so on.

The communications interface 156 is operatively configured to communicate with components of the cable 100. For example, the communications interface 156 can be configured to transmit data for storage in the cable 100, retrieve data from storage in the cable 100, and so forth. The communications interface 156 is also communicatively coupled with the processor 152 to facilitate data transfer between components of the cable 100 and the processor 152 (e.g., for communicating inputs to the processor 152 received from a device communicatively coupled with the controller 150). It should be noted that while the communications interface 156 is described as a component of a controller 150, one or more components of the communications interface 156 can be implemented as external components communicatively coupled to the cable 100 via a wired and/or wireless connection. The cable 100 can also comprise and/or connect to one or more input/output (I/O) devices (e.g., via the communications interface 156), including, but not necessarily limited to: a display, a mouse, a touchpad, a keyboard, and so on.

The communications interface 156 and/or the processor 152 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 156 can be configured to communicate with a single network or multiple networks across different access points.

With reference to FIG. 7, the process control system 200 implements a secure control system. For example, the process control system 200 includes a security credential source (e.g., a factory 222) and a security credential implementer (e.g., a key management entity 224). The security credential source is configured to generate a unique security credential (e.g., a key, a certificate, etc., such as the unique identifier 130, and/or the security credential 132). The security credential implementer is configured to provision the cables 100, the devices 128, the control elements or subsystems 202, e.g., the I/O modules 204, the control modules 206, the power supplies 212, and so forth, with a unique security credential generated by the security credential source. For instance, a cable 100 and a device 128 can each be provisioned with unique security credentials.

An authentication process for authenticating the cables 100, the devices 128, and/or the control elements or subsystems 202 connected to the cables 100 is performed based upon the unique security credentials. For example, in embodiments, a cable 100 and a device 128 are operable to bi-directionally communicate with one another based on the unique security credentials (e.g., based upon the authentication process). Further, in the secure process control system 200 disclosed herein, multiple (e.g., every) cable 100, device 128, control element or subsystem 202 (e.g., I/O modules, power supplies, physical interconnect devices, etc.) of the process control system 200 is provisioned with security credentials for providing security at multiple (e.g., all) levels of the process control system 200. Still further, the elements can be provisioned with the unique security credentials (e.g., keys, certificates, etc.) during manufacture (e.g., at birth), and can be managed from birth by a key management entity 224 of the process control system 200 for promoting security of the process control system 200.

In embodiments of the disclosure, communications between elements and/or physical interconnect devices (e.g., cables 100) of the process control system 200 includes an authentication process. The authentication process can be performed for authenticating an element and/or physical interconnect device implemented in the process control system 200. In implementations, the authentication process can utilize security credentials associated with the element and/or physical interconnect device for authenticating that element and/or physical interconnect device. For example, the security credentials can include encryption keys, certificates (e.g., public key certificates, digital certificates, identity certificates, security certificates, asymmetric certificates, standard certificates, non-standard certificates) and/or identification numbers. In embodiments, controllers 150 (e.g., secure microcontrollers) that are included in and/or connected to the cables 100 of the process control system 200 can be configured for performing the authentication process.

In implementations, multiple control elements or subsystems 202 (e.g., elements and/or physical interconnect devices) of the process control system 200 are provisioned with their own unique security credentials. For example, each element of the process control system 200 is provisioned with its own unique set(s) of certificates, encryption keys and/or identification numbers when the element is manufactured (e.g., the individual sets of keys and certificates are defined at the birth of the element). The sets of certificates, encryption keys and/or identification numbers are configured for providing/supporting strong encryption. The encryption keys can be implemented with standard (e.g., commercial off-the-shelf (COTS)) encryption algorithms, such as National Security Agency (NSA) algorithms, National institute of Standards and Technology (NIST) algorithms, or the like.

Based upon the results of the authentication process, the element being authenticated can be activated, partial functionality of the element can be enabled or disabled within the process control system 200, complete functionality of the element can be enabled within the process control system 200, and/or functionality of the element within the process control system 200 can be completely disabled (e.g., no communication facilitated between that element and other elements of the process control system 200).

In embodiments, the keys, certificates and/or identification numbers associated with an element of the process control system 200 can specify the original equipment manufacturer (OEM) of that element. As used herein, the term "original equipment manufacturer" or "OEM" can be defined as an entity that physically manufactures the device (e.g., element) and/or a supplier of the device such as an entity that purchases the device from a physical manufacturer and sells the device. Thus, in embodiments, a device can be manufactured and distributed (sold) by an OEM that is both the physical manufacturer and the supplier of the device. However, in other embodiments, a device can be distributed by an OEM that is a supplier, but is not the physical manufacturer. In such embodiments, the OEM can cause the device to be manufactured by a physical manufacturer (e.g., the OEM can purchase, contract, order, etc. the device from the physical manufacturer).

Additionally, where the OEM comprises a supplier that is not the physical manufacturer of the device, the device can bear the brand of the supplier instead of brand of the physical manufacturer. For example, in embodiments where an element (e.g., a cable 100) is associated with a particular OEM that is a supplier but not the physical manufacturer, the element's keys, certificates and/or identification numbers can specify that origin. During authentication of an element of the process control system 200, when a determination is made that an element being authenticated was manufactured or supplied by an entity that is different than the OEM of one or more other elements of the process control system 200, then the functionality of that element can he at least partially disabled within the process control system 200. For example, limitations can be placed upon communication (e.g., data transfer) between that element and other elements of the process control system 200, such that the element can not work/function within the process control system 200. When one of the elements of the process control system 200 requires replacement, this feature can prevent a user of the process control system 200 from unknowingly replacing the element with a non-homogenous element (e.g., an element having a different origin (a different OEM) than the remaining elements of the process control system 200) and implementing the element in the process control system 200. In this manner, the techniques described herein can prevent the substitution of elements (which can furnish similar functionality) of other OEM's into a secure process control system 200 manufactured and/or supplied by the originating OEM (the OEM that originally supplied the process control system 200 to the user) in place of elements manufactured and/or supplied by the originating OEM without the approval of the originating OEM.

In another instance, a user can attempt to implement an incorrectly designated (e.g., mismarked) element within the process control system 200. For example, the mismarked element can have a physical indicia marked upon it which falsely indicates that the element is associated with the same OEM as the OEM of the other elements of the process control system 200. In such instances, the authentication process implemented by the process control system 200 can cause the user to be alerted that the element is counterfeit. This process can also promote improved security for the process control system 200, since counterfeit elements are often a vehicle by which malicious software can be introduced into the process control system 200. In embodiments, the authentication process provides a secure air gap for the process control system 200, ensuring that the secure industrial control system is physically isolated from insecure networks.

In implementations, the secure process control system 200 includes a key management entity 224. The key management entity 224 can be configured for managing cryptographic keys (e.g., encryption keys) in a cryptosystem. This managing of cryptographic keys (e.g., key management) can include the generation, exchange, storage, use, and/or replacement of the keys. For example, the key management entity 224 is configured to serve as a security credentials source, generating unique security credentials (e.g., public security credentials, secret security credentials) for the elements of the process control system 200. Key management pertains to keys at the user and/or system level (e.g., either between users or systems).

In embodiments, the key management entity 224 comprises a secure entity such as an entity located in a secure facility. The key management entity 224 can be remotely located from the I/O modules 204, the control modules 206, and the network 220. For example, a firewall 226 can separate the key management entity 224 from the control elements or subsystems 202 and the network 220 (e.g., a corporate network). In implementations, the firewall 226 can be a software and/or hardware-based network security system that controls ingoing and outgoing network traffic by analyzing data packets and determining whether the data packets should be allowed through or not, based on a rule set. The firewall 226 thus establishes a barrier between a trusted, secure internal network (e.g., the network 220) and another network 228 that is not assumed to be secure and trusted (e.g., a cloud and/or the Internet). In embodiments, the firewall 226 allows for selective (e.g., secure) communication between the key management entity 224 and one or more of the control elements or subsystems 202 and/or the network 220. In examples, one or more firewalls can be implemented at various locations within the process control system 200. For example, firewalls can be integrated into switches and/or workstations of the network 220.

The secure process control system 200 can further include one or more manufacturing entities (e.g., factories 222). The manufacturing entities can be associated with original equipment manufacturers (OEMs) for the elements of the process control system 200. The key management entity 224 can be communicatively coupled with the manufacturing entity via a network (e.g., a cloud). In implementations, when the elements of the process control system 200 are being manufactured at one or more manufacturing entities, the key management entity 224 can be communicatively coupled with (e.g., can have an encrypted communications pipeline to) the elements. The key management entity 224 can utilize the communications pipeline for provisioning the elements with security credentials (e.g., inserting keys, certificates and/or identification numbers into the elements) at the point of manufacture.

Further, when the elements are placed into use (e.g., activated), the key management entity 224 can be communicatively coupled (e.g., via an encrypted communications pipeline) to each individual element worldwide and can confirm and sign the use of specific code, revoke (e.g., remove) the use of any particular code, and/or enable the use of any particular code. Thus, the key management entity 224 can communicate with each element at the factory where the element is originally manufactured (e.g., born), such that the element is born with managed keys. A master database and/or table including all encryption keys, certificates and/or identification numbers for each element of the process control system 200 can be maintained by the key management entity 224. The key management entity 224, through its communication with the elements, is configured for revoking keys, thereby promoting the ability of the authentication mechanism to counter theft and re-use of components.

In implementations, the key management entity 224 can be communicatively coupled with one or more of the control elements or subsystems 202 and/or the network 220 via another network (e.g., a cloud and/or the Internet) and firewall. For example, in embodiments, the key management entity 224 can be a centralized system or a distributed system. Moreover, in embodiments, the key management entity 224 can be managed locally or remotely. In some implementations, the key management entity 224 can be located within (e.g., integrated into) the network 220 and/or the control elements or subsystems 202. The key management entity 224 can provide management and/or can be managed in a variety of ways. For example, the key management entity 224 can be implemented/managed: by a customer at a central location, by the customer at individual factory locations, by an external third party management company and/or by the customer at different layers of the process control system 200, and at different locations, depending on the layer.

Varying levels of security (e.g., scalable, user-configured amounts of security) can be provided by the authentication process. For example, a base level of security can be provided which authenticates the elements and protects code within the elements. Other layers of security can be added as well. For example, security can be implemented to such a degree that a component, such as the cable 100, cannot power up without proper authentication occurring. In implementations, encryption in the code is implemented in the elements, security credentials (e.g., keys and certificates) are implemented on the elements. Security can be distributed (e.g., flows) through the process control system 200. For example, security can flow through the process control system 200 all the way to an end user, who knows what a module is designed to control in that instance. In embodiments, the authentication process provides encryption, identification of devices for secure communication and authentication of system hardware or software components (e.g., via digital signature).

In implementations, the authentication process can be implemented to provide for and/or enable interoperability within the secure process control system 200 of elements manufactured and/or supplied by different manufacturers/vendors/suppliers (e.g., OEMs). For example, selective (e.g., some) interoperability between elements manufactured and/or supplied by different manufacturers/vendors/ suppliers can be enabled. In embodiments, unique security credentials (e.g., keys) implemented during authentication can form a hierarchy, thereby allowing for different functions to be performed by different elements of the process control system 200.

The communication links connecting the components of the process control system 200 can further employ data packets, such as runt packets packets (e.g., packets smaller than sixty-four (64) bytes), placed (e.g., injected and/or stuffed) therein, providing an added level of security. The use of runt packets increases the level of difficulty with which outside information (e.g., malicious content such as false messages, malware (viruses), data mining applications, etc.) can be injected onto the communications links. For example, runt packets can be injected onto a communication link within gaps between data packets transmitted between a control module 206 and a cable 100 to hinder an external entity's ability to inject malicious content onto the communication link.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A cable comprising:
   a wiring assembly having a plurality of wires bundled together by a sleeve;
   a connector assembly comprising a connector for connecting to a device, the connector assembly having a plurality of connections for respective ones of the plurality of wires, the connector assembly capturing an end of the wiring assembly; and
   a controller configured to authenticate the device connected to the cable by the connector using a security credential associated with the device.

2. The cable as recited in claim 1, further comprising a knuckle pivotally connected to the connector assembly so that the wiring assembly can articulate with respect to the connector assembly in a plane defined by the longitudinal axis of the connector and the end of the wiring assembly.

3. The cable as recited in claim 2, wherein the connector assembly and the knuckle form a detent to arrest movement of the wiring assembly with respect to the connector assembly.

4. The cable as recited in claim 3, wherein at least one of the knuckle or the connector assembly comprises a notch configured to interface with a corresponding tooth on the other of the at least one of the knuckle or the connector assembly.

5. The cable as recited in claim 1, wherein at least one connection of the plurality of connections comprises a keyed connection.

6. The cable as recited in claim 1, wherein the connector assembly comprises a connector housing that captures the connector and the wiring assembly.

7. A cable comprising:
   a wiring assembly comprising a plurality of wires bundled together by a sleeve;
   a connector assembly comprising a connector for connecting to a device, the connector assembly having a plurality of connections for respective ones of the plurality of wires, the connector assembly capturing an end of the wiring assembly; and
   circuitry configured to authenticate the device connected to the cable by the connector.

8. The cable as recited in claim 7, wherein the circuitry is configured to authenticate the cable to a device connected to the cable by the connector and stores at least one of a unique identifier or a security credential associated with the cable.

9. The cable as recited in claim 7, wherein the circuitry is configured to at least one of establish or prevent connection to the device connected to the cable based upon authentication.

10. The cable as recited in claim 7, wherein the circuitry is configured to encrypt communication between the cable and the device.

11. The cable as recited in claim 7, further comprising an indicator configured to indicate authentication of the device connected to the cable.

12. The cable as recited in claim 11, wherein the indicator comprises an indicator light.

13. The cable as recited in claim 7, wherein the wiring assembly comprises a knuckle, the plurality of connections are arranged along a longitudinal axis, and the knuckle of the wiring assembly is pivotally connected to the connector assembly so that the wiring assembly can articulate with respect to the connector assembly in a plane defined by the longitudinal axis of the connector and the end of the wiring assembly.

14. A control system comprising:
   a control element or subsystem coupled with a backplane; and
   a cable configured to connect to the control element or subsystem, the cable having a plurality of wires bundled together by a sleeve and a connector assembly comprising a connector having a plurality of connections for respective ones of the plurality of wires, the connector assembly of the cable configured to connect to the control element or subsystem, wherein the cable includes a controller configured to authenticate a device connected to the cable by the connector.

15. The control system as recited in claim 14, wherein the backplane comprises at least one of a power backplane or a communications backplane.

16. The control system as recited in claim 14, wherein the control element or subsystem is coupled with the backplane immediately adjacent to a second control element or subsystem.

17. A control system comprising:
- a first control element or subsystem coupled with a backplane;
- a first cable configured to connect to the first control element or subsystem;
- a second control element or subsystem coupled with the backplane adjacent to the first control element or subsystem; and
- a second cable configured to connect to the second control element or subsystem, each one of the first cable and the second cable comprising a wiring assembly comprising a plurality of wires bundled together by a sleeve and a connector assembly comprising a connector having a plurality of connections for respective ones of the plurality of wires, the connector assembly capturing an end of the wiring assembly, each one of the first cable and the second cable comprising circuitry configured to authenticate the first control element or subsystem and the second control element or subsystem to respective ones of the first cable and the second cable.

18. The control system as recited in claim 17, wherein the backplane comprises at least one of a power backplane or a communications backplane.

19. The control system as recited in claim 17, wherein the first control element or subsystem is coupled with the backplane immediately adjacent to the second control element or subsystem.

20. The control system as recited in claim 17, wherein the wiring assembly of at least one of the first cable or the second cable comprises a knuckle, the plurality of connections are arranged along a longitudinal axis, and the knuckle of the wiring assembly is pivotally connected to the connector assembly so that the wiring assembly can articulate with respect to the connector assembly in a plane defined by the longitudinal axis of the connector and the end of the wiring assembly.

* * * * *